(12) United States Patent
Narula et al.

(10) Patent No.: US 12,641,422 B2
(45) Date of Patent: May 26, 2026

(54) SYSTEM AND METHOD OF A SECURE VIRTUAL WIRELESS LEASH FOR WIRELESS PERIPHERAL DEVICES

(71) Applicant: Dell Products LP, Round Rock, TX (US)

(72) Inventors: Harpreet S. Narula, Austin, TX (US); Kai Leong Wong, Singapore (SG)

(73) Assignee: DELL PRODUCTS, LP, Round Rock, TX (US)

( * ) Notice: Subject to any disclaimer, the term of this patent is extended or adjusted under 35 U.S.C. 154(b) by 99 days.

(21) Appl. No.: 18/642,725

(22) Filed: Apr. 22, 2024

(65) Prior Publication Data

US 2025/0330809 A1 Oct. 23, 2025

(51) Int. Cl.
*H04W 12/06* (2021.01)
*H04W 12/041* (2021.01)

(52) U.S. Cl.
CPC ....... *H04W 12/068* (2021.01); *H04W 12/041* (2021.01)

(58) Field of Classification Search
CPC .......................... H04W 12/068; H04W 12/041
See application file for complete search history.

(56) References Cited

U.S. PATENT DOCUMENTS

| | | | | |
|---|---|---|---|---|
| 6,088,450 | A * | 7/2000 | Davis .................. | H04W 12/065 235/382 |
| 7,843,327 | B1 * | 11/2010 | DiMartino ......... | G08B 21/0227 340/815.45 |
| 8,018,334 | B1 | 9/2011 | Dimartino | |
| 9,848,075 | B1 * | 12/2017 | Ahmad .................. | G16H 40/67 |
| 10,154,367 | B2 * | 12/2018 | James ..................... | H04L 43/16 |
| 10,852,828 | B1 * | 12/2020 | Gatson ................. | G06T 19/006 |
| 2003/0115395 | A1 * | 6/2003 | Karcher ............... | G06F 1/1632 710/303 |
| 2010/0062833 | A1 * | 3/2010 | Mattice ............... | G11B 19/042 463/24 |
| 2011/0162042 | A1 * | 6/2011 | Xiao ..................... | H04L 9/3234 726/3 |

(Continued)

OTHER PUBLICATIONS

US 11,743,804 B1, 08/2023, Zanski (withdrawn)

*Primary Examiner* — J. Brant Murphy
(74) *Attorney, Agent, or Firm* — Prol Intellectual Property Law, PLLC; H. Kenneth Prol

(57) ABSTRACT

A managed host information handling system includes a hardware processor to communicate with a managed wireless peripheral device to determine that the managed wireless peripheral device is executing code instructions of a peripheral managed device service (MDS) module to determine whether a first leash token stored at the managed host information handling system matches a received, second leash token from the managed wireless peripheral device indicating the managed wireless peripheral device is leashed. The hardware processor executes code instructions of a host MDS module to initiate an authorized pairing process with the managed wireless peripheral device when the leash tokens match or prevents pairing when the leash tokens do not match. The hardware processor to execute code instructions of a one-time-password (OTP) algorithm to generate an OTP to exclusively pair the managed host information handling system with the managed wireless peripheral device.

20 Claims, 6 Drawing Sheets

(56) References Cited

U.S. PATENT DOCUMENTS

| | | | | |
|---|---|---|---|---|
| 2016/0066248 | A1* | 3/2016 | Sato ..................... | H04W 40/22 |
| | | | | 370/315 |
| 2017/0064760 | A1* | 3/2017 | Kandagadla .......... | H04W 12/35 |
| 2017/0223540 | A1* | 8/2017 | Battiwalla ........... | H04L 63/0492 |
| 2018/0317174 | A1* | 11/2018 | Chaubey ........... | H04W 52/0248 |
| 2021/0219095 | A1* | 7/2021 | Iyer ...................... | H04W 4/023 |
| 2022/0301410 | A1* | 9/2022 | Erdmann, IV ........ | H04W 4/021 |

* cited by examiner

601

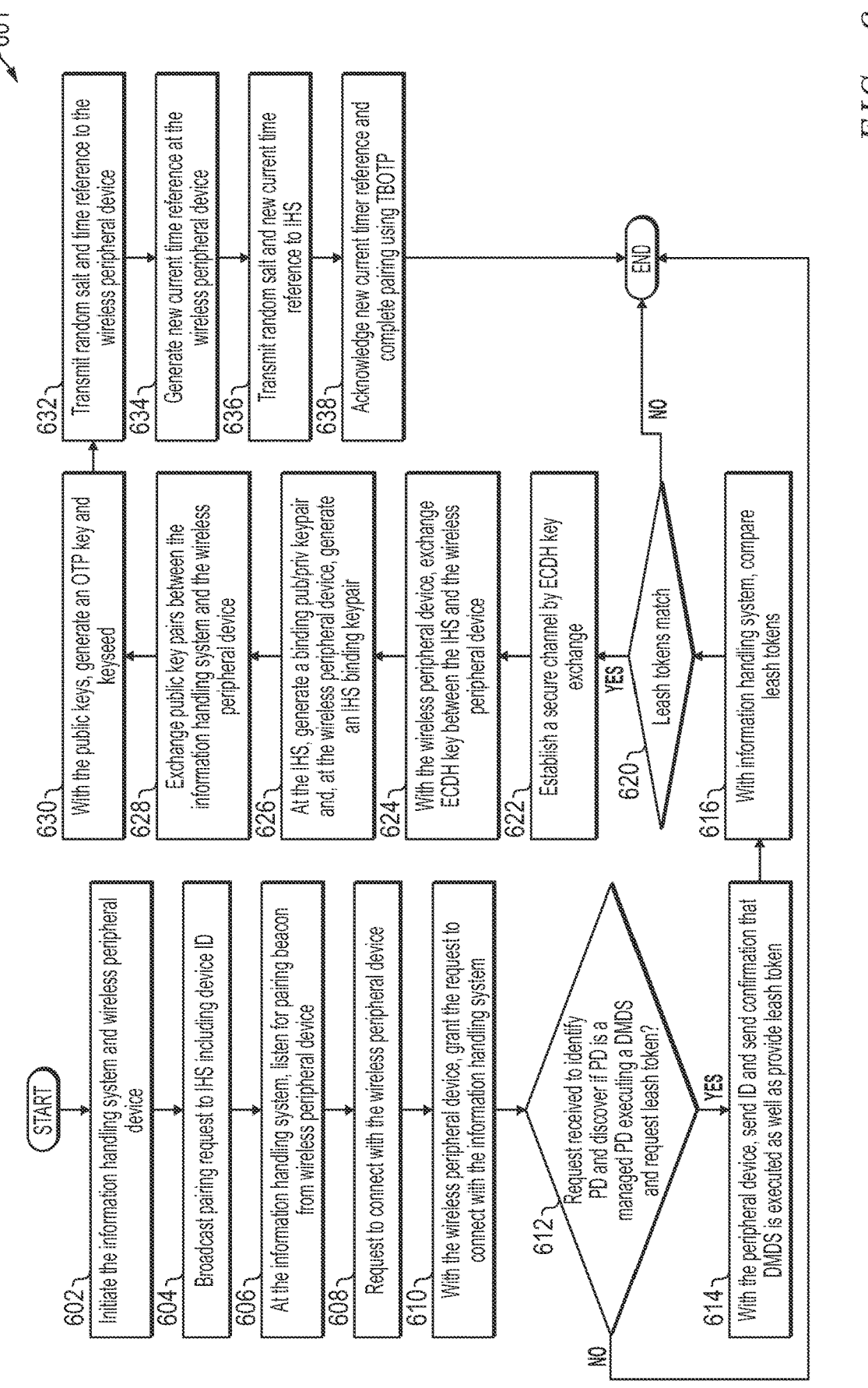

FIG. 6

632 Transmit random salt and time reference to the wireless peripheral device

634 Generate new current time reference at the wireless peripheral device

636 Transmit random salt and new current time reference to IHS

638 Acknowledge new current timer reference and complete pairing using TBOTP

630 With the public keys, generate an OTP key and keyseed

628 Exchange public key pairs between the information handling system and the wireless peripheral device 626 At the IHS, generate a binding pub/priv keypair and, at the wireless peripheral device, generate an IHS binding keypair 624 With the wireless peripheral device, exchange ECDH key between the IHS and the wireless peripheral device 622 Establish a secure channel by ECDH key exchange 620 Leash tokens match

YES

NO

END

616 With information handling system, compare leash tokens

START

602 Initiate the information handling system and wireless peripheral device

604 Broadcast pairing request to IHS including device ID

606 At the information handling system, listen for pairing beacon from wireless peripheral device 608 Request to connect with the wireless peripheral device 610 With the wireless peripheral device, grant the request to connect with the information handling system 612 Request received to identify PD and discover if PD is a managed PD executing a DMDS and request leash token?

NO

YES

614 With the peripheral device, send ID and send confirmation that DMDS is executed as well as provide leash token

SYSTEM AND METHOD OF A SECURE VIRTUAL WIRELESS LEASH FOR WIRELESS PERIPHERAL DEVICES

FIELD OF THE DISCLOSURE

The present disclosure generally relates to a system to operatively couple a peripheral device to an information handling system. The present disclosure more specifically relates to a system and method to wirelessly leash a peripheral devices to an information handling system to wirelessly and operatively couple the peripheral devices to pair only with an authorized information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more workspace productivity applications, gaming applications, or the like. Further, the information handling system may include a radio to operatively couple or pair one or more peripheral devices to the information handling system for wireless operation.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 6 is a flowchart showing a method of pairing a peripheral device to an information handling system and leashing that peripheral device to the information handling system using a leash token according to an embodiment of the present disclosure.

The use of the same reference symbols in different drawings may indicate similar or identical items.

DETAILED DESCRIPTION OF THE DRAWINGS

Figure 1:
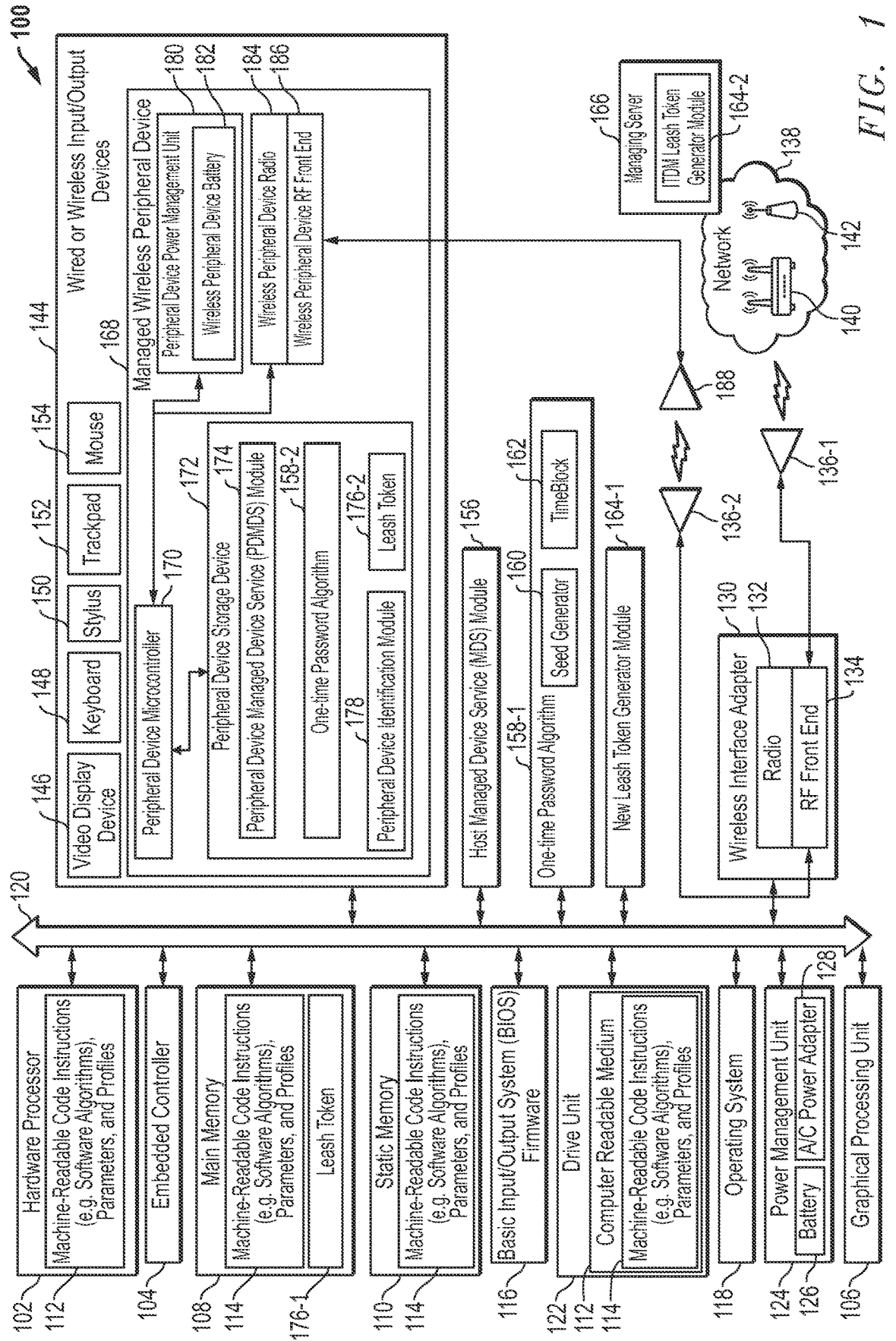
FIG. 1 is a block diagram illustrating an information handling system that may be operatively coupled to a wireless peripheral device with the first peripheral device being only wirelessly couplable to the information handling system via a leash token according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems may be operatively coupled to a peripheral device that allows the user to interact with the information handling system. These peripheral devices may include a mouse, a keyboard, a video display device, a stylus, a trackpad, and the like that allows a user to provide input to the information handling system and receive output from the information handling system. These peripheral devices may be wirelessly couplable to the information handling system through the use of various radio frequency (RF) radios in the information handling system and the peripheral device. This operative coupling is referred to as pairing the peripheral device to the information handling system. Current pairing processes may include initiation or turning on the information handling system and peripheral device and initiating an initial communication such that confirmation and authentication pairing data may be exchanged between the peripheral device and information handling system.

A pairing process may not necessarily, however, limit the wireless peripheral device to be operatively coupled to other information handling systems. For example, a wireless peripheral device may be operatively coupled to the information handling system via a dongle or other hardware device that is plugged into a universal serial bus (USB) port in the information handling system. However, with more internal radios being used for information handling systems and the reduction in the number of USB ports available in information handling systems recently, the option to use such a dongle may be undesirable or impossible. Still further, the wireless peripheral device may be stolen or otherwise displaced allowing others to use the wireless peripheral device with their own information handling systems by repairing the peripheral device to another host information handling system. With the universality in wireless pairing of the wireless peripheral device to any information handling system, this may increase the occurrences of theft of wireless peripheral devices by others. This may be undesirable in an enterprise where plural peripheral devices and information handling systems are managed by an information technology decision maker (ITDM) or others within the enterprise to manage a fleet or group of wireless peripheral devices.

The present specification describes a managed information handling system that includes a hardware processor, a data storage device, a wireless radio to operatively pair a managed wireless peripheral device to the managed information handling system, and a power management unit to provide power to the hardware processor, the data storage device, and the wireless radio. Thus, the managed information handling system may also be referred to as a host information handling system that may pair and leash the managed wireless peripheral device in embodiments herein. The managed information handling system may operate such that the hardware processor may, via the wireless radio, communicate with the managed wireless peripheral device via a secure link to determine that the managed wireless peripheral device is executing computer-readable program code instructions of a peripheral device managed device service module to be managed and controlled or limited to the managed information handling system. The managed information handling system may also operate such that the hardware processor may, via the wireless radio, communicate with the managed wireless peripheral device via a secure link to determine that a leash token on the managed information handling system matches a leash token located on a peripheral device data storage device. This leash token may, in an embodiment, be provided by another entity via a managing information handling system that manages or oversees operations of both the managed information handling system and the managed wireless peripheral device such as an internet technology decision maker (ITDM) or manufacturer of the wireless peripheral device. The leash token from the ITDM or manufacturer may be stored on a secure data storage device on the wireless peripheral device prior to the wireless peripheral device being initiated or turned on and/or prior to the wireless peripheral device being shipped to the ITDM or the user. The matching leash token provided to and stored in a secure area on the managed information handling system may be uploaded to a secure data storage device on the managed information handling system or it may be created at the information handling system itself and stored on the secure data storage device in various embodiments herein.

In an embodiment, the leash token is used to confirm, by the managed host information handling system that the wireless peripheral device broadcasting to the managed host information handling system has the same leash token as the managed host information handling system. The leash token can include any unique identifier or identifiable information that cannot be updated "in the field" by the user without authorization to do so. This authorization may include a password and/or other authentication data that may allow the user to change the leash token on the managed host information handling system and wireless peripheral device or transfer the leash token to another, second information handling system in order to change the information handling system that the wireless peripheral device is leashed to. In an embodiment, the leash token is used during the pairing process such that the user is not required to confirm pairing with the host information handling system as a result of the leash token being unique to the both the host information handling system and the wireless peripheral device.

In an embodiment, the hardware processor of the host information handling system may execute computer-readable program code instructions of a host managed device service (MDS) module to initiate the pairing process with the wireless peripheral device after determining that that managed wireless peripheral device supports management by a managing information handling system and is storing the matching leash token on a peripheral device data storage device. This allows the hardware processor of the managed host information handling system to, in an embodiment, execute computer-readable program code instructions of a one-time-password (OTP) algorithm to generate an OTP to exclusively pair the managed host information handling system with the managed wireless peripheral device based on the matching leash token. In an embodiment, the OTP may be used to securely complete the pairing process between the managed host information handling system and the wireless peripheral device.

In an embodiment, the broadcast from the wireless peripheral device for pairing with the managed host information handling system may include device identification data that identifies the wireless peripheral device as a managed peripheral device that can only connect to the managed host information handling system that has a matching leash token. This broadcast may also allow for a managed host information handling system that does not include a matching leash token to identify the user and/or information handling system the wireless peripheral device is to be or is leashed to currently. A hardware microcontroller of the wireless peripheral device may execute computer-readable program code instructions of a peripheral device managed device service (PDMDS) to communicate with a managed host information handling system (e.g., an information handling system executing computer-readable program code of the host MDS module) and provide any identification that allows the user of the managed host information handling system to identify who the wireless peripheral device belongs to. This data may be accessed via a network connection with the managed host information handling system to access a database maintained by a managing server and at a managing information handling system operated by an ITDM. This allows an ITDM, for example, within an enterprise to quickly identify the owner of the wireless peripheral device within the enterprise when, for example, the owner had inadvertently left the wireless peripheral device in a conference room or other location.

In an embodiment, execution of the host MDS module or similar software/firmware by a hardware processor may also allow a user or ITDM to unleash the managed host information handling system from the wireless peripheral device and transfer or create a new leash token for the wireless peripheral device to be leashed to another information handling system. This process, in an embodiment, may require authorization via, for example, a password to allow such a transfer. This allows a user or ITDM to swap out the managed host information handling system when, for example, the old managed host information handling system it to be swapped out for a newer managed host information handling system for a user but the wireless peripheral device will remain the same for that user.

In an embodiment, the execution of the peripheral device MDS module by the hardware microcontroller of the wireless peripheral device may allow for a single wireless connection with the managed host information handling system. For example, where the wireless peripheral device includes multiple wireless connection slots that allow the wireless peripheral device to be potentially paired with multiple other devices (e.g., an information handling system, a smartphone, and the like), the execution of the peripheral device MDS module may eliminate any additional wireless slots by preventing any pairing data to be stored on the data storage device of the wireless peripheral device that allows the wireless peripheral device to be paired with any other information handling system or other pairable device.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 140, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions. According to embodiments herein, information handling system 100 may operate as a managed host information handling system that leashes a wireless peripheral device 168. Information handling system 100, or similar device, may also operate as a managing information handling system or server 166 operated by an ITDM to determine which managed host information handling system to leash a managed wireless peripheral device to in other embodiments herein.

The information handling system 100 may include main memory 108, (volatile (e.g., random-access memory, etc.), or static memory 110, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, or any combination thereof. Additional components of the information handling system 100 may include one or more storage devices such as static memory 110 or drive unit 122. The information handling system 100 may include or interface with one or more communications ports for communicating with external devices, as well as various input and output (I/O) devices 144, such as a mouse 154, a trackpad 152, a stylus 150, a keyboard 148, a video/graphics display device 146, the managed wireless peripheral device 168 described herein, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 114 that may operate on servers or systems, remote data centers, or on-box in individual client information handling systems according to various embodiments herein. In some embodiments, it is understood any or all portions of instructions (e.g., software algorithms), parameters, and profiles 114 may operate on a plurality of information handling systems 100.

The information handling system 100 may include the hardware processor 102 such as a central processing unit (CPU) or other hardware processing resources. Any of the hardware processing resources may operate to execute code that is either firmware or software code. Moreover, the information handling system 100 may include memory such as main memory 108, static memory 110, and disk drive unit 122 (volatile (e.g., random-access memory, etc.), nonvolatile memory (read-only memory, flash memory etc.) or any combination thereof or other memory with computer readable medium 112 storing instructions (e.g., software algorithms), parameters, and profiles 114 executable by the hardware processor 102, EC 104, GPU 106, or any other hardware processing device. The information handling system 100 may also include one or more buses 120 operable to transmit communications between the various hardware components such as any combination of various I/O devices 144 as well as between hardware processors 102, an EC 104, the operating system (OS) 118, the basic input/output system (BIOS) 116, the wireless interface adapter 130, or a radio module, among other components described herein. In an embodiment, the hardware processor 102, EC 104, and/or GPU 106 may execute one or more bus drivers in order to transmit this data between the information handling system 100 and the input/output devices 144 described herein. In an embodiment, the information handling system 100 may be in wired or wireless communication with the I/O devices 144 such a keyboard 148, a mouse 154, video display device 146, stylus 150, trackpad 152, the managed wireless peripheral device 168 described herein, among other peripheral devices.

As described herein, the information handling system 100 further includes a video/graphics display device 146. The video/graphics display device 146 in an embodiment may function as a liquid crystal display (LCD), an organic light emitting diode (OLED), a flat panel display, or a solid-state display. It is appreciated that the video/graphics display device 146 may be wired or wireless and may be an external video/graphics display device 146 that allows a user to increase the desktop area by extending the desktop in an embodiment. Additionally, as described herein, the information handling system 100 may include or be operatively coupled to a cursor control device (e.g., a trackpad 152, or gesture or touch screen input), a stylus 150, and/or a keyboard 148, among others that allows the user to interface with the information handling system 100 via the video/graphics display device 146. Information handling system 100 may also be operatively coupled to a wired or wireless input/output device 144 such as the managed wireless peripheral device 168 or other hardware devices that may include a hardware processing device such as a hardware processor, microcontroller, or other hardware processing resource. Various drivers and hardware control device electronics may be operatively coupled to operate the I/O devices 144 according to the embodiments described herein. The present specification contemplates that the I/O devices 144 may be wired or wireless.

A network interface device of the information handling system 100 may be wired or wireless such as shown with wireless interface adapter 130 that can provide wireless connectivity among devices such as with Bluetooth® or to a network 138, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 132, RF front end 134 and antenna 136 is used to communicate with the wireless peripheral devices including the first wireless peripheral device 156 and second wireless peripheral device 178, via, for example, a Bluetooth® or Bluetooth® Low Energy (BLE) protocols. In other embodiments, Bluetooth®, BLE or other WPAN or WLAN may be used for communication with and among a wireless peripheral device, such as the managed wireless peripheral device 168 that may be leashed to the information handling system 100 as a managed host information handling system, or any other wireless peripheral device to be paired with the information handling system 100.

In other embodiments, a WAN, WWAN, LAN, and WLAN may each include an AP 140 or base station 142 used to operatively couple the information handling system 100 to a network 138 via a wireless interface adapter 130. In a specific embodiment, the network 138 may include macro-cellular connections via one or more base stations 142 or a wireless AP 140 (e.g., Wi-Fi), or such as through licensed or unlicensed WWAN small cell base stations 142. Connectivity may be via wired or wireless connection. For example, wireless network wireless APs 140 or base stations 142 may be operatively connected to the information handling system 100. Wireless interface adapter 130 may include one or more RF (RF) subsystems (e.g., radio 132) with transmitter/receiver circuitry, modem circuitry, one or more antenna RF (RF) front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable code instructions, parameters, and profiles 114 or receives and executes instructions, parameters, and profiles 114 responsive to a propagated signal, so that a hardware device connected to a network 138 may communicate voice, video, or data over the network 138. Further, the instructions 114 may be transmitted or received over the network 138 via the network interface device or wireless interface adapter 130.

The information handling system 100 may include a set of instructions 114 that may be executed to cause the computer system to perform any one or more of the methods or computer-based functions disclosed herein. For example, instructions 114 may be executed by a hardware processor 102, GPU 106, EC 104 or any other hardware processing resource and may include software agents, or other aspects or components used to execute the methods and systems described herein. Various software modules comprising application instructions 114 may be coordinated by an OS 118, and/or via an application programming interface (API) include a unified device API described herein. An example OS 118 may include Windows®, Android®, and other OS types. Example APIs may include Win 32, Core Java API, or Android APIs.

In an embodiment, the information handling system 100 may include a disk drive unit 122. The disk drive unit 122 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106 or EC 104, or other microcontroller unit to perform the processes described herein. Similarly, main memory 108 and static memory 110 may also contain a computer-readable medium for storage of one or more sets of machine-readable code instructions, parameters, or profiles 114 described herein. The disk drive unit 122 or static memory 110 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 108, the static memory 110, and/or within the disk drive 122 during execution by the hardware processor 102, EC 104, or GPU 106 of information handling system 100.

Main memory 108 or other memory of the embodiments described herein may contain computer-readable medium (not shown), such as RAM in an example embodiment. An example of main memory 108 includes random access memory (RAM) such as static RAM (SRAM), dynamic RAM (DRAM), non-volatile RAM (NV-RAM), or the like, read only memory (ROM), another type of memory, or a combination thereof. Static memory 110 may contain computer-readable medium (not shown), such as NOR or NAND flash memory in some example embodiments. The applications and associated APIs, for example, may be stored in static memory 110 or on the disk drive unit 122 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 124 (a.k.a. a power supply unit (PSU)). The PMU 124 may include a hardware controller and executable machine-readable code instructions to manage the power provided to the components of the information handling system 100 such as the hardware processor 102 and other hardware components described herein. The PMU 124 may control power to one or more components including the one or more drive units 122, the hardware processor 102 (e.g., CPU), the EC 104, the GPU 106, a video/graphic display device 146, or other wired I/O devices 144 such as the mouse 154, the stylus 150, the keyboard 148, and the trackpad 152 and other components that may require power when a power button has been actuated by a user. In an embodiment, the PMU 124 may monitor power levels and be electrically coupled to the information handling system 100 to provide this power. The PMU 124 may be coupled to the bus 120 to provide or receive data or machine-readable code instructions. The PMU 124 may regulate power from a power source such as the battery 126 or AC power adapter 128. In an embodiment, the battery 126 may be charged via the AC power adapter 128 and provide power to the components of the information handling system 100, via wired connections as applicable, or when AC power from the AC power adapter 128 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 may operate as managed host information handling system 100 to pair and leash a managed wireless peripheral device 168 to the managed host information handling system 100 based on policy or selection from an enterprise managing information handling system such as by an ITDM for a user of the managed host information handling system 100. As described above, an information handling system 100 or similar, may operate as a managing information handling system or server used by the enterprise or ITDM in some embodiments herein. The managed host information handling system 100 may execute computer readable program code instructions of a host managed device service (MDS) module 156 to coordinate and leash the managed wireless peripheral device 168 to the managed host information handling system 100. As described herein, the wireless pairing of the managed host information handling system 100 to the managed wireless peripheral device 168 may depend on whether the managed wireless peripheral device 168 is operating as a managed wireless peripheral device 168 or not by virtue of the peripheral device microcontroller 170 executing computer readable program code instructions of a peripheral device MDS module 174. Additionally, wireless pairing of the managed host information handling system 100 to the managed wireless peripheral device 168 may depend on whether a leash token 176-1 maintained on a data storage device (e.g., main memory 108, static memory 110, computer-readable medium 112, etc.) of the managed host information handling system 100 matches a leash token 176-2 maintained on a data storage device of the managed wireless peripheral device 168.

In an embodiment, the managed wireless peripheral device 168 may include a peripheral device microcontroller 170 to execute computer readable program code instructions accessible to the peripheral device microcontroller 170 on a peripheral device storage device 172. In an embodiment, the peripheral device microcontroller 170 may be any type of hardware processing device. In an embodiment, the computer-readable program code includes computer-readable program code instructions of a peripheral device MDS module 174. During operation and when the managed wireless peripheral device 168 is initialized, the execution of the peripheral device MDS module 174 by the peripheral device microcontroller 170 causes the managed wireless peripheral device 168 to broadcast, wirelessly, an advertisement packet that informs listening or receiving information handling systems such as the managed host information handling system 100 that the managed wireless peripheral device 168 is operating as a managed wireless peripheral device 168 executing the peripheral device MDS module 174. In an embodiment, the broadcasted advertisement package may include data describing the make, model, MAC address, and other identifiers that allow the receiving devices such as the managed host information handling system 100 to specifically identify the managed wireless peripheral device 168.

During operation, when the managed host information handling system 100 detects this broadcast, and initiates a preliminary communication with the managed wireless peripheral device 168. This initial communication includes, in an embodiment, the identification of the managed wireless peripheral device 168, a confirmation whether the peripheral device microcontroller 170 is executing computer-readable program code of the peripheral device MDS module 174, and whether the managed wireless peripheral device 168 is storing a leash token 176-2. As such, the managed wireless peripheral device 168, in an embodiment, may transmit the identification data, a confirmation that the peripheral device microcontroller 170 is executing the peripheral device MDS module 174 thereby operating as a managed wireless peripheral device 168, and provide the leash token 176-2 to the managed host information handling system 100 to determine pairing and whether the managed wireless peripheral device 168 is leashed to and may operate with the managed host information handling system 100.

With this received data, the hardware processor 102 of the managed host information handling system 100 may determine that, based on the confirmation from the managed wireless peripheral device 168 that the peripheral device microcontroller 170 is executing the peripheral device MDS module 174, the information handling system 100 may act as a managed host information handling system 100 and determine whether the managed wireless peripheral device 168 is to be operatively coupled to the managed host information handling system 100. This may be done by comparing the received leash token 176-2 from the managed wireless peripheral device 168 to a leash token 176-1, 176-2 stored on a data storage device at the managed host information handling system 100.

It is appreciated that where the received leash token 176-2 from the managed wireless peripheral device 168 does not match the leash token 176-1, 176-2 stored on a data storage device at the managed host information handling system 100 or the information handling system 100 does not have such a leash token 176-1, 176-2 or does not operate any host MDS module 156, wireless peripheral device 168 and the information handling system 100 do not proceed with wireless pairing. In an embodiment, however, the managed host information handling system 100 may be provided with the capability to determine which information handling system the managed wireless peripheral device 168 is to be paired to and/or is assigned to if it is an information handling system that is managed and executing code instructions of a host MDS module 156. For example, the execution of the computer-readable program code instructions of the host MDS module 156 allows the user to discover an owner or assigned user of the managed wireless peripheral device 168 and, accordingly, an information handling system that the managed wireless peripheral device 168 is to be paired with or is already paired with via communications with a back end managing information handling system or server 166 and an ITDM in some embodiments herein. In an example embodiment, the information handling system 100 may access a managing server 166 via a network 138 connection. By accessing the managing server 166, the hardware processor 102 of the information handling system 100 may compare the leash token 176-2 received from the managed wireless peripheral device 168 to a listing of leash tokens associated with a number of or all managed wireless peripheral devices and associated owners, enterprises, addresses, contact information, or other user identification information that may allow a user of the managed host information handling system 100 to return the managed wireless peripheral device 168 to the correct owner/user and a different managed host information handling system 100.

Where the received leash token 176-2 from the managed wireless peripheral device 168 does match the leash token 176-1, 176-2 stored on a data storage device at the managed host information handling system 100, the managed host information handling system 100 may proceed with securely and automatically pairing the managed wireless peripheral device 168 to the managed host information handling system 100. In an embodiment, the confirmation that the received leash token 176-2 from the managed wireless peripheral device 168 matches the leash token 176-1, 176-2 stored on a data storage device at the managed host information handling system 100 serves as a confirmation that the managed wireless peripheral device 168 is a trusted device that is to be wirelessly coupled to the managed host information handling system 100.

In an embodiment, the managed host information handling system 100 and the managed wireless peripheral device 168 may engage in establishing a secure wireless connection. In an example embodiment, the managed host information handling system 100 may execute computer-readable program code instructions of a one-time password (OTP) algorithm 158-1 to create this secure wireless connection. In an embodiment, the execution of the OTP algorithm 158-1, 158-2 may cause the managed host information handling system 100 to establish a secure channel via the ECDH key exchange. This may include, for example, the managed host information handling system 100 transmitting an information handling system public key (e.g., of a PrivateKeyP1/PublicKeyP1) to the managed wireless peripheral device 168 transmitting a peripheral device public key (e.g., of a DevPrivateKeyP1/DevPublicKeyP1 pair) to the managed host information handling system 100. Additionally, a shared key may be generated by both the managed host information handling system 100 and managed wireless peripheral device 168 by the managed host information handling system 100 executing the computer-readable program code instructions of the OTP algorithm 158-1 and the peripheral device microcontroller 170 of the managed wireless peripheral device 168 executing computer-readable program code instructions of the same OTP algorithm 158-2. Each of the managed host information handling system 100 and managed wireless peripheral device 168 may use these reciprocal public keys as input into a hash-based message authentication code (HMAC) algorithm to create a shared key. In an embodiment, this pair of keys are used as a fall back reset session key setup to be used in those scenarios where the connection between the managed wireless peripheral device 168 and the managed host information handling system 100 is to be reset or refreshed.

In an embodiment, this shared key may further be used to generate an OTP to be used as a session key. This OTP may be a time-based OTP (TBOTP) that uses a timeblock 162 to generate a current time stamp used within the HMAC algorithm (e.g., HMAC256). Additionally, a seed generator 160 may be used to generate a random seed to be used as input to the HMAC algorithm. With a concatenation of the current time stamp and the random seed with the session key via the HMAC algorithm results in a TBOTP at both the managed host information handling system 100 and the managed wireless peripheral device 168 for completion of the secure pairing of the managed host information handling system 100 to the managed wireless peripheral device 168. It is appreciated that, although a specific OTP algorithm 158-1, 158-2 is described herein, the present specification contemplates that any type of OTP algorithm 158-1, 158-2 may be used to create the session key as described herein.

In an embodiment, the managed wireless peripheral device 168 may execute computer-readable program code instructions of a peripheral device identification module 178. The execution of the peripheral device identification module 178 may cause the managed wireless peripheral device 168, via the wireless peripheral device radio 184, wireless peripheral device RF front end 186, and wireless peripheral device antenna 188, to broadcast data that may include device identification data that identifies the managed wireless peripheral device 168 as a managed peripheral device that can only connect to the managed host information handling system 100 that has a matching leash token. This broadcast may also allow for the managed host information handling system 100 that does not include a matching leash token 176-1, 176-2 to identify the user and/or managed host information handling system 100 the managed wireless peripheral device 168 is to be or is leashed to currently. In an embodiment, the peripheral device microcontroller 170 of the managed wireless peripheral device 168 may execute computer-readable program code instructions of the peripheral device MDS module 174 to communicate with the managed host information handling system 100 (e.g., any information handling system executing computer-readable program code of a host MDS module 156) and provide any identification that allows the user of the managed host information handling system to identify who the managed wireless peripheral device 168 belongs to. This data may be accessed via a network connection with the managed host information handling system 100 to access a database maintained by the managing server 166. This allows an ITDM, for example, within an enterprise to quickly identify the owner of the managed wireless peripheral device 168 within the enterprise when, for example, the owner had inadvertently left the wireless peripheral device in a conference room or other location.

In an embodiment, it might be necessary or beneficial for the managed wireless peripheral device 168 to be switched from being leashed to the managed host information handling system 100 and instead leashed to a different information handling system. This may occur where, for example, reassignment of the managed wireless peripheral device 168 to another user is necessary and the user will be working with a different information handling system than the managed host managed information handling system 100 shown in FIG. 1. In other embodiments, a current managed host information handling system 100 may be outdated or relatively obsolete such that a new managed host information handling system 100 is to be purchased on behalf of the user. Where the managed wireless peripheral device 168 is still in working order, the ability of the managed wireless peripheral device 168 to be reassigned to a second new or different managed host information handling system may be accomplished through the execution of computer-readable program code instructions of a new leash token generator module 164-1, 164-2 described herein from the managing server 166.

In an embodiment, the execution of the computer-readable program code instructions of the new leash token generator module 164-1 by the hardware processor 102 of the managed host information handling system 100 may present to the user or the ITDM at the managing server 166 the option to change/create a new leash token 176-1, 176-2 or transfer the current leash token 176-1. In an embodiment, execution of the new leash token generator module 164-1 may allow a user or the ITDM to access a graphical user interface (GUI) presented on a video display device 146 of the managed host information handling system 100 or a managing server 166 to transfer the leash token. For example, the GUI may present an option to the ITDM to input a password or other authentication input at either the managed host information handling system 100 if accessible or the managing server 166 to confirm that the ITDM is authorized to change/generate a new leash token 176-1 or transfer the current leash token 176-1 to another managed host information handling system. In an embodiment, a user may also be provided with the necessary authentication data to input into the GUI to complete similar tasks by the ITDM.

Execution of the new leash token generator module 164-1, in an embodiment, allows the managed host information handling system 100 or ITDM leash token generator module 164-2 executing on the managing server 166 to generate a new leash token 176-1 that can be transferred to a new managed host information handling system. In an embodiment, this new leash token may be generated using, for example, a hash function similar to that associated with the OTP algorithm 158-1 and may include a concatenation of multiple inputs into this hash function in order to create a unique and new leash token.

In an alternative embodiment, the execution of the new leash token generator module 164-1 may allow the user or ITDM to transfer the current leash token 176-1 to a new managed host information handling system either via a wired connection or a wireless connection such as from managing server 166. In yet another alternative embodiment, the execution of the computer-readable program code instructions of the new leash token generator module 164-1 by the hardware processor 102 may allow the managed host information handling system 100 to communicate with the managing server 166 and upload the current or newly-generated leash token 176-1 to a database on the managing server 166 for later transfer to the new managed host information handling system. This may allow an ITDM, for example, to complete the transmission of the current leash token 176-1 or newly-generated leash token, remotely, to another managed host information handling system when the new managed host information handling system is ready to receive the new leash token. In yet another embodiment, the ITDM may access the managing server 166 to execute a new leash token generator module 164-2 by a hardware processor of the managing server 166 to transfer the newly-generated or current leash token 176-1 to the new managed host information handling system. It is appreciated that the transfer of the leash token 176-1 from the managed host information handling system 100 to another managed host information handling system requires the deletion of any other copies of the leash token 176-1 on the current managed host information handling system 100. This deletion may be automatically completed upon transfer of the leash token 176-1. This will prevent the managed wireless peripheral device 168 from being wirelessly couplable to multiple information handling systems. Where a new leash token 176-1 is generated, the old leash token 176-1 on the managed host information handling system 100 will also be automatically deleted.

In an embodiment, the managed wireless peripheral device 168 may include a peripheral device PMU 180. The peripheral device PMU 180 may include a hardware controller and executable machine-readable code instructions to manage the power provided to the components of the managed wireless peripheral device 168 such as the peripheral device microcontroller 170 and other hardware components described herein. In an embodiment, the peripheral device PMU 180 may monitor power levels to each of these hardware components. The peripheral device PMU 180 may regulate power from a power source such as the wireless peripheral device battery 182.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
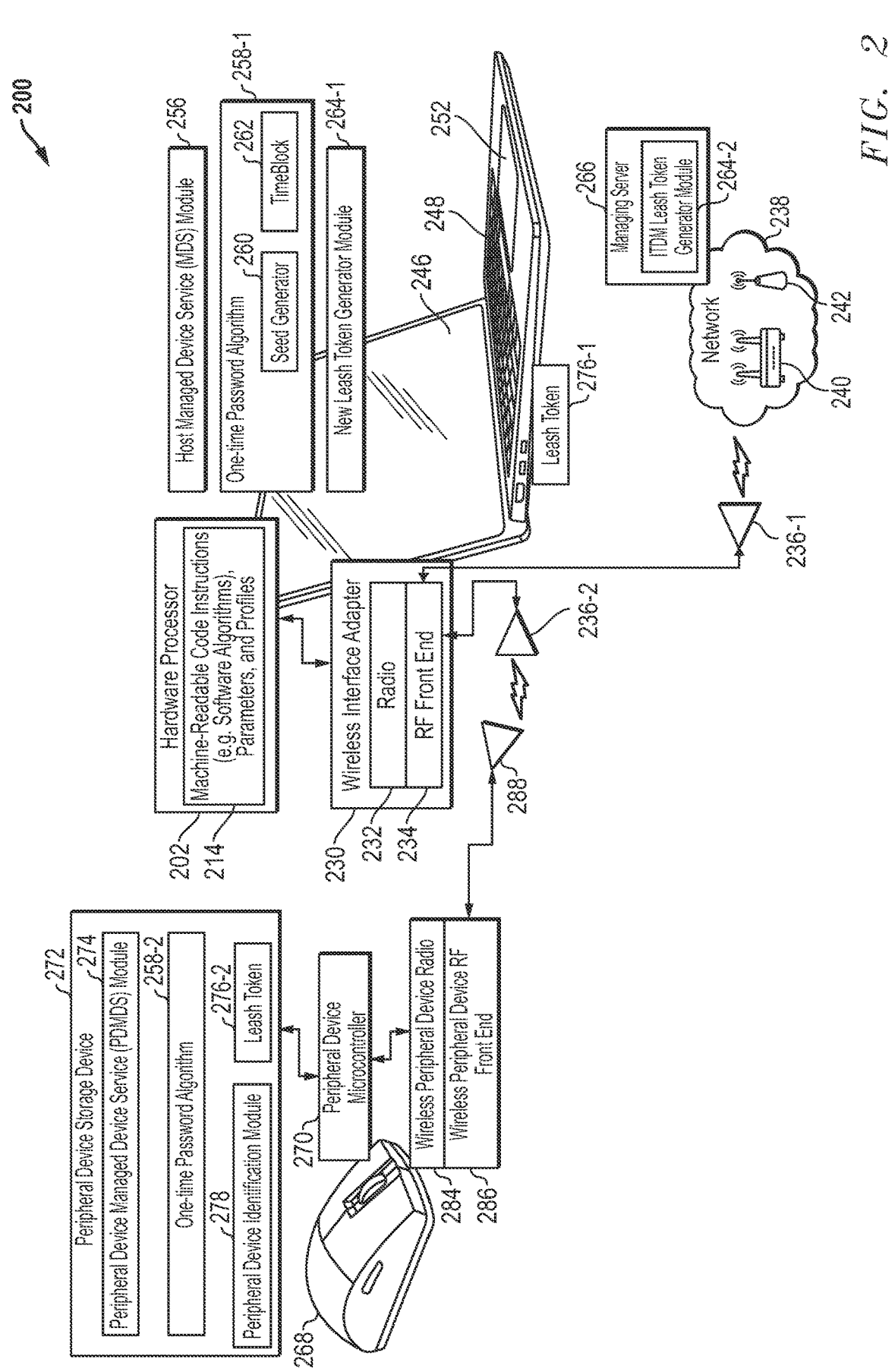
FIG. 2 is a graphic and block diagram illustrating an information handling system that may be operatively coupled to a wireless peripheral device with the wireless peripheral device being only wirelessly couplable to the information handling system via a leash token according to another embodiment of the present disclosure.

FIG. 2 is a graphic and block diagram illustrating a managed host information handling system 200 that may be operatively coupled to a wireless peripheral device 268 with the wireless peripheral device 268 being leashed to and only wirelessly couplable to the managed host information handling system via a leash token according to another embodiment of the present disclosure. FIG. 2 shows that the managed host information handling system 200 is a laptop-type information handling system. It is appreciated that the managed host information handling system 200 may be any type of information handling system. The managed host information handling system 200 of FIG. 2 also shows a built-in keyboard 248 and trackpad 252 that allow the user to provide input to the managed host information handling system 200.

Additionally, FIG. 2 shows a wireless mouse as the managed wireless peripheral device 268. It is appreciated that the managed wireless peripheral device 268 may be any type of wireless peripheral device such as a wireless stylus, a wireless video display device, a wireless trackpad, and the like. Therefore, the wireless mouse shown in FIG. 2 is merely an example of a wireless peripheral device that can be leashed and wirelessly coupled to the managed host information handling system 200 using the leash token as described herein.

In the embodiment shown in FIG. 2, the information handling system 200 may operate as managed host information handling system 200 to establish the leashed pairing of a managed wireless peripheral device 268 to the managed host information handling system 200. The managed host information handling system 200 may execute computer readable program code instructions of a host managed device service (MDS) module 256 to coordinate and leash the managed wireless peripheral device 268 to the managed host information handling system 200. The pairing process implements the use of the leash tokens 276-1, 276-2 described herein to securely and automatically pair the managed wireless peripheral device 268 to the managed host information handling system 200 without user input needed.

During the pairing process, the wireless pairing of the managed host information handling system 200 to the managed wireless peripheral device 268 may depend on whether the managed wireless peripheral device 268 is operating as a managed wireless peripheral device 268 or not. Again, this may be determined by detecting whether the peripheral device microcontroller 270 is executing computer readable program code instructions of a peripheral device MDS module 274. In an embodiment, the managed wireless peripheral device 268 may transmit this information to the managed host information handling system 200 during this initial communication with the managed wireless peripheral device 268.

Where the managed wireless peripheral device 268 is found to not be a managed wireless peripheral device, the pairing process may include user interaction that may require a user to provide input to initiate and proceed through a typical pairing process. Additionally, while this allows this non-managed wireless peripheral device to be paired with any managed host information handling system, an unauthorized third party is prevented from using the managed wireless peripheral device 268 if the managed wireless peripheral device 268 is accidentally misplaced by the user. By leashing the managed wireless peripheral device 268 to the managed host information handling system 200, although the user may not be able to pair and use the managed wireless peripheral device 268 with any other information handling system, the pairing process discourages others from taking the managed wireless peripheral device 268 since it cannot be wirelessly paired and operatively coupled to other information handling systems.

Additionally, wireless pairing of the managed host information handling system 200 to the managed wireless peripheral device 268 may depend on whether a leash token 276-1 maintained on a data storage device (e.g., main memory, static memory, computer-readable medium, etc.) of the managed host information handling system 200 matches a leash token 276-2 maintained on the peripheral device storage device 272 of the managed wireless peripheral device 268. Where no matching leash token 276-2 is broadcasted by the managed wireless peripheral device 268 to the managed host information handling system 200 the pairing process is prevented in an embodiment. Similarly, where no matching leash token 276-1 is available at the managed host information handling system 200 or the managed host information handling system 200 does not have executable code instructions for a host MDS module 256, the pairing process is prevented by the managed wireless peripheral device 268 in other embodiments.

In an embodiment, the managed wireless peripheral device 268 may include a peripheral device microcontroller 270 to execute computer readable program code instructions accessible to the peripheral device microcontroller 270 on a peripheral device storage device 272. The peripheral device microcontroller 270 may be any type of hardware processing device described herein. In an embodiment, the computer-readable program code includes computer-readable program code instructions of a peripheral device MDS module 274. During operation and when the managed wireless peripheral device 268 is initialized, the execution of the peripheral device MDS module 274 by the peripheral device microcontroller 270 causes the managed wireless peripheral device 268 to broadcast, wirelessly, an advertisement packet that informs listening or receiving information handling systems such as the managed host information handling system 200 that the managed wireless peripheral device 268 is operating as a managed wireless peripheral device 268 executing the peripheral device MDS module 274. In an embodiment, the broadcasted advertisement package may include data describing the make, model, MAC address, and other identifiers that allow the receiving devices such as the information handling system 200 to specifically identify the managed wireless peripheral device 268.

During operation, when the information handling system 200 detects this broadcast, and initiates a preliminary communication with the managed wireless peripheral device 268. This broadcast from the managed wireless peripheral device includes, in an embodiment, the identification of the managed wireless peripheral device 268, a confirmation whether the peripheral device microcontroller 270 is executing computer-readable program code of the peripheral device MDS module 274, and whether the managed wireless peripheral device 268 is storing a leash token 276-2. As such, the managed wireless peripheral device 268, in an embodiment, may transmit the identification data, a confirmation that the peripheral device microcontroller 270 is executing the peripheral device MDS module 274 thereby operating as a managed wireless peripheral device 268, and provide the leash token 276-2 to the managed host information handling system 200. Similarly, a response from the managed host information handling system 200 to the initial pairing process broadcast may indicate that the managed host information handling system 200 is operating a host MDS module 256 such that comparison of leash tokens 276-1 and 276-2 may occur in an embodiment.

With this received data, the hardware processor 202 of the managed host information handling system 200 may execute code instructions of the host MDS module 256, if present, to determine that, based on the confirmation from the managed wireless peripheral device 268 that the peripheral device microcontroller 270 is executing the peripheral device MDS module 274, the information handling system 200 may act as a managed host information handling system 200 and determine whether the managed wireless peripheral device 268 is to be operatively coupled to the managed host information handling system 200. This may be done by comparing the received leash token 276-2 from the managed wireless peripheral device 268 to a leash token 276-1 stored on a data storage device at the managed host information handling system 200.

It is appreciated that where the received leash token 276-2 from the managed wireless peripheral device 268 does not match the leash token 276-1 stored on a data storage device at the managed host information handling system 200, the managed host information handling system 200 or the managed wireless peripheral device 268 will not proceed with wirelessly pairing the managed wireless peripheral device 268 with the information handling system 200. In an embodiment, however, the managed host information handling system 200 may be provided with the capability to determine which information handling system the managed wireless peripheral device 268 is to be paired to and/or is assigned to if executing the host MDS module 256 and operatively coupled to a managing server 266 in an enterprise. For example, the execution of the computer-readable program code instructions of the host MDS module 256 allows the user to discover an owner or assigned user of the managed wireless peripheral device 268 and, accordingly, an information handling system that the managed wireless peripheral device 268 is to be paired with or is already paired with. In an example embodiment, the information handling system 200 may access a managing server 266 via a network 238 connection. By accessing the managing server, the hardware processor 202 of the managed host information handling system 200 may compare the leash token 276-2 received from the managed wireless peripheral device 268 to a listing of leash tokens associated with a number of or all managed wireless peripheral devices and associated owners, enterprises, addresses, contact information, other managed host information handling system or other user identification information that may allow a user of the managed host information handling system 200 to return the managed wireless peripheral device 268 to the correct owner/user.

Where the received leash token 276-2 from the managed wireless peripheral device 268 does match the leash token 276-1 stored on a data storage device at the managed host information handling system 200, the managed host information handling system 200 may proceed with securely and automatically pairing the managed wireless peripheral device 268 to the managed host information handling system 200. In an embodiment, the confirmation that the received leash token 276-2 from the managed wireless peripheral device 268 matches the leash token 276-1 stored on a data storage device at the information handling system 200 serves as a confirmation that the managed wireless peripheral device 268 is a trusted device that is to be automatically wirelessly coupled to the managed host information handling system 200.

In an embodiment, the managed host information handling system 200 and the managed wireless peripheral device 268 may engage in establishing a secure wireless connection. In one example embodiment, the managed host information handling system 200 may execute computer-readable program code instructions of a one-time password (OTP) algorithm 258-1 to create this secure wireless connection. In an embodiment, the execution of the OTP algorithm 258-1, 258-2 may cause the managed host information handling system 200 to establish a secure channel via an elliptic curve Diffie-Hellman (ECDH) key exchange. This may include, for example, the managed host information handling system 200 transmitting an information handling system public key (e.g., of a PrivateKeyP1/PublicKeyP1) to the managed wireless peripheral device 268 transmitting a peripheral device public key (e.g., of a DevPrivateKeyP1/DevPublicKeyP1 pair) to the managed host information handling system 200. Additionally, a shared key may be generated by both the managed host information handling system 200 and managed wireless peripheral device 268 via the managed host information handling system 200 executing the computer-readable program code instructions of the OTP algorithm 258-1 and the peripheral device microcontroller 270 of the managed wireless peripheral device 268 executing computer-readable program code instructions of the same OTP algorithm 258-2. Each of the managed host information handling system 200 and managed wireless peripheral device 268 may use these reciprocal public keys as input into a hash-based message authentication code (HMAC) algorithm to create a shared key. In an embodiment, this pair of keys are used as a fall back reset session key setup to be used in those scenarios where the connection between the managed wireless peripheral device 268 and the managed host information handling system 200 is to be reset or refreshed.

In an embodiment, this shared key may further be used to generate an OTP to be used as a session key. This OTP may be a time-based OTP (TBOTP) that uses a timeblock 262 to generate a current time stamp used within the HMAC algorithm (e.g., HMAC256). Additionally, a seed generator 260 may be used to generate a random seed to be used as input to the HMAC algorithm. With a concatenation of the current time stamp and the random seed with the session key via the HMAC algorithm results in a TBOTP at both the managed host information handling system 200 and the managed wireless peripheral device 268 for completion of the secure pairing of the managed host information handling system 200 to the managed wireless peripheral device 268. It is appreciated that, although a specific OTP algorithm 258-1, 258-2 is described herein, the present specification contemplates that any type of OTP algorithm 258-1, 258-2 may be used to create the session key as described herein.

In an embodiment, the managed wireless peripheral device 268 may execute computer-readable program code instructions of a peripheral device identification module 278. The execution of the peripheral device identification module 278 may cause the managed wireless peripheral device 268, via the wireless peripheral device radio 284, wireless peripheral device RF front end 286, and wireless peripheral device antenna 288, to broadcast data that may include device identification data that identifies the managed wireless peripheral device 268 as a managed peripheral device that can only wireless couple to the managed host information handling system 200 that has a matching leash token. This broadcast may also allow for the managed host information handling system 200 that does not include a matching leash token 276-1, 276-2 to identify the user and/or information handling system the managed wireless peripheral device 268 is to be or is leashed to currently. In an embodiment, the peripheral device microcontroller 270 of the managed wireless peripheral device 268 may execute computer-readable program code instructions of the peripheral device MDS module 274 to communicate with the managed host information handling system 200 (e.g., any information handling system executing computer-readable program code of a host MDS module 256) and provide any identification that allows the user of the managed host information handling system to identify who the managed wireless peripheral device 268 belongs to. This data may be accessed via a network connection with the managed host information handling system 200 to access a database maintained by the managing server 266. This allows an ITDM, for example, within an enterprise to quickly identify the owner of the managed wireless peripheral device 268 within the enterprise when, for example, the owner had inadvertently left the wireless peripheral device in a conference room or other location.

In an embodiment, it might be necessary or beneficial for the managed wireless peripheral device 268 to be switched from being leashed to the managed host information handling system 200 and instead leashed to a different managed host information handling system. This may occur where, for example, reassignment of the managed wireless peripheral device 268 to another user is necessary and the user will be working with a different managed host information handling system than the managed host information handling system 200 shown in FIG. 2. In other embodiments, a current information handling system 200 may be outdated or relatively obsolete such that a new managed host information handling system 200 is to be purchased on behalf of the user. Where the managed wireless peripheral device 268 is still in working order, the ability of the managed wireless peripheral device 268 to be reassigned to a second new or different managed host information handling system may be accomplished through the execution of computer-readable program code instructions of a new leash token generator modules 264-1, 264-2 described herein.

In an embodiment, the execution of the computer-readable program code instructions of the new leash token generator module 264-1 by the hardware processor 202 of the managed host information handling system 200 may present to the user or ITDM the option to change/create a new leash token 276-1, 276-2 or transfer the current leash token 276-1. In an embodiment, execution of the new leash token generator module 264-1 may allow a user or ITDM to access a graphical user interface (GUI) presented on a video display device 246 of the managed host information handling system 200 to transfer the leash token. For example, the GUI may present an option to the ITDM to input a password or other authentication input to confirm that the ITDM is authorized to change/generate a new leash token 276-1 or transfer the current leash token 276-1 to another information handling system. In an embodiment, a user may also be provided with the necessary authentication data to input into the GUI to complete similar tasks by the ITDM.

Execution of the new leash token generator module 264-1, in an embodiment, allows the managed host information handling system 200 to generate a new leash token 276-1 that can be transferred to a new managed host information handling system. In an embodiment, this new leash token may be generated using, for example, a hash function similar to that associated with the OTP algorithm 258-1 and may include a concatenation of multiple inputs into this hash function in order to create a unique and new leash token. This new leash token may include any number of bytes and may be sufficiently long of enough to provide a level of security between the managed wireless peripheral device 268 and a newly assigned managed host information handling system.

In an alternative embodiment, the execution of the new leash token generator module 264-1 may allow the user or ITDM to transfer the current leash token 276-1 to a new managed host information handling system either via a wired connection or a wireless connection. In yet another embodiment, the execution of the computer-readable program code instructions of the new leash token generator module 264-1 by the hardware processor 202 may allow the managed host information handling system 200 to communicate with the managing server 266 and upload the current or newly-generated leash token 276-1 to a database on the managing server 266 for later transfer to the new information handling system by, for example, an ITDM or have the newly-generated leash token 276-1 or 276-2 generated at the managing server 266. This may allow an ITDM, for example, to complete the transmission of the current leash token 276-1 or newly-generated leash token, remotely, to another information handling system when the new managed host information handling system is ready to receive the new leash token. In yet another embodiment, the ITDM may access the managing server 266 to execute a new leash token generator module 264-2 by a hardware processor of the managing server 266 to transfer the newly-generated or current leash token 276-1 to the new managed host information handling system. It is appreciated that the transfer of the leash token 276-1 from the managed host information handling system 200 to another information handling system requires the deletion of any other copies of the leash token 276-1 on the managed host information handling system 200. This deletion may be automatically completed upon transfer of the leash token 276-1. This will prevent the managed wireless peripheral device 268 from being wirelessly couplable to multiple information handling systems. Where a new leash token 276-1 is generated, the old leash token 276-1 on the managed host information handling system 200 will also be automatically deleted.

As described herein, the managed wireless peripheral device 268 may include a peripheral device PMU 280. The peripheral device PMU 280 may include a hardware controller and executable machine-readable code instructions to manage the power provided to the components of the managed wireless peripheral device 268 such as the peripheral device microcontroller 270 and other hardware components described herein. In an embodiment, the peripheral device PMU 280 may monitor power levels to each of these hardware components. The peripheral device PMU 280 may regulate power from a power source such as the wireless peripheral device battery 282.

Figure 3:
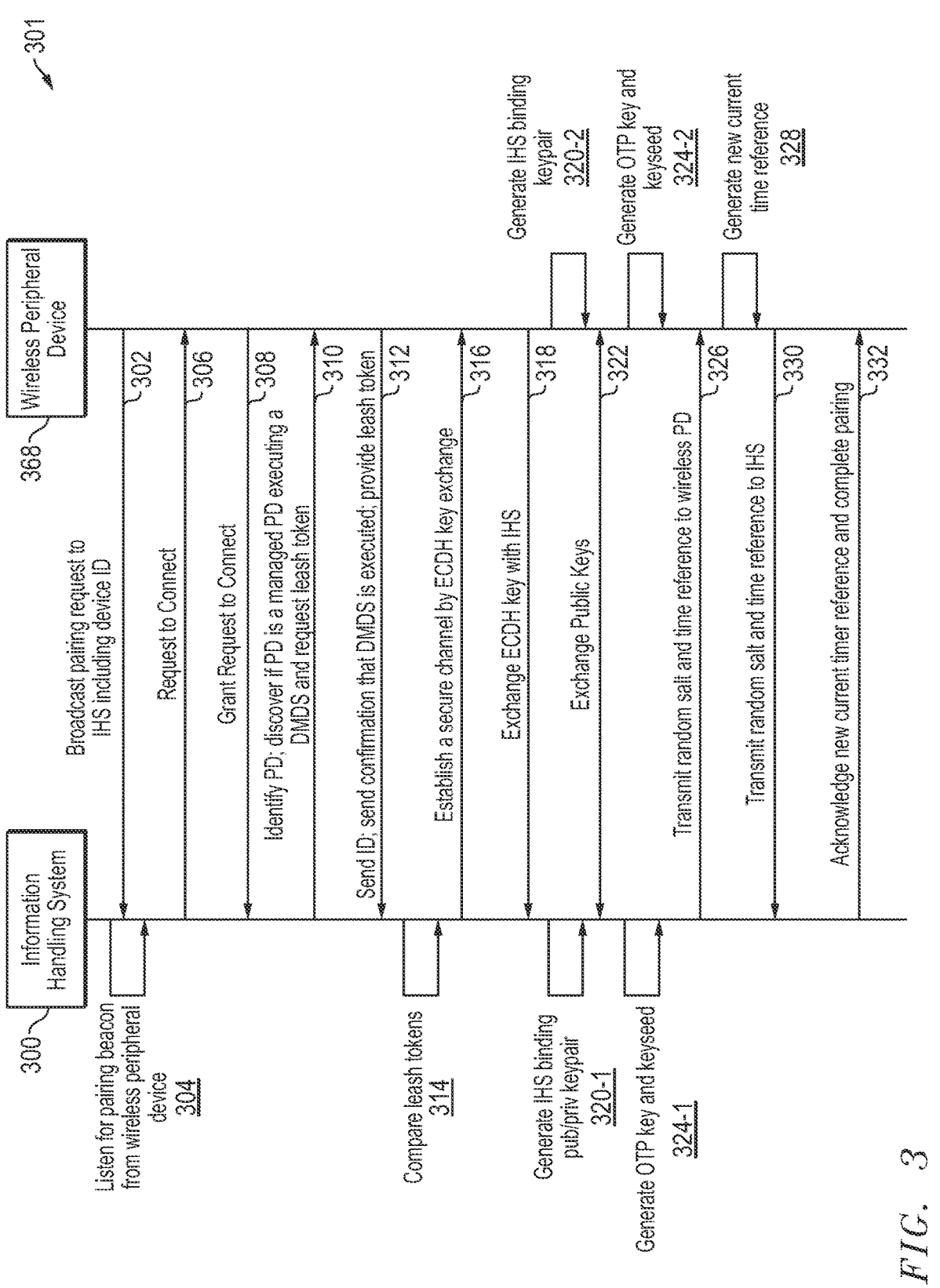
FIG. 3 is a flowchart showing a method of pairing a peripheral device to an information handling system and leashing that peripheral device to the information handling system using a leash token according to an embodiment of the present disclosure.

FIG. 3 is a swim lane flowchart showing a method 301 of pairing a wireless peripheral device 368 to an information handling system 300 and leashing that wireless peripheral device 368 to the managed host information handling system 300 using a leash token if that information handling system turns out to be a managed host information handling system executing a host MDS module according to an embodiment of the present disclosure. As described herein, the method 301 shown in FIG. 3 may be completed upon initiation of the managed wireless peripheral device 368 by the user actuating a switch, button, or other actuation key used to turn on the managed wireless peripheral device 368.

The initiation of the managed wireless peripheral device 368 causes the peripheral device PMU to provide power to the peripheral device microcontroller. The peripheral device microcontroller may then, at line 302, broadcast the pairing request to the managed host information handling system 300. Again, this broadcast includes at least a device ID to identify the managed wireless peripheral device 368 to the managed host information handling system 300. At line 304, the managed host information handling system 300 may listen or otherwise detect the pairing beacon from the managed wireless peripheral device.

At line 306 a request to connect with the managed wireless peripheral device 368 is sent from the managed host information handling system 300. This request is responded to by the managed wireless peripheral device 368 granting the request to connect at line 308. As described herein, this communication is facilitated by a wireless interface device transceiving with a wireless peripheral device radio 384 via, for example, a Bluetooth® or Bluetooth® Low Energy (BLE) protocols.

At lines 310 and 312, the information handling system 300 may request and receive from the managed wireless peripheral device 368 the identification data, a confirmation that the peripheral device microcontroller is executing the peripheral device MDS module thereby operating as a managed wireless peripheral device 368. The wireless peripheral device 368 may also provide the leash token to the managed host information handling system 300 if the managed host information handling system 300 is also executing code instructions of a host MDS module. Again, this leash token is stored on a secure data storge device within the managed wireless peripheral device 368 for comparison to an onboard leash token stored there.

At line 314, the managed host information handling system 300 may compare the leash token received from the managed wireless peripheral device 368 with a leash token maintained on a secure data storage device within the managed host information handling system 300. In this embodiment, the information handling system 300 may function as a managed host information handling system 300 and determine whether the managed wireless peripheral device 368 is to be operatively coupled to the managed host information handling system 300. It is appreciated that where the received leash token from the managed wireless peripheral device 368 does not match the leash token stored on a data storage device at the managed host information handling system 300 or that the information handling system does not have or operate a host MDS module and has no leash token and, thus, is not a managed host information handling system, the information handling system 300 does not proceed with wirelessly pairing the managed wireless peripheral device 368 with the information handling system 300. Where it is determined that the leash tokens do not match, the managed host information handling system 300 executing code instructions of a host MDS module may be provided with the capability to determine which information handling system the managed wireless peripheral device 368 is to be paired to and/or is currently assigned to. For example, the execution of the computer-readable program code instructions of the host MDS module allows the user to discover an owner or assigned user of the managed wireless peripheral device 368 and, accordingly, an information handling system that the managed wireless peripheral device 368 is to be paired with or is already paired with via operative connectivity with a managing server. In an example embodiment, the information handling system 300 may access the managing server via a wired or wireless network connection. By accessing the managing server, the hardware processor of the managed host information handling system 300 may have compared the leash token received from the managed wireless peripheral device 368 to a listing of leash tokens associated with a number of or all managed wireless peripheral devices and associated owners, enterprises, addresses, contact information, or other user identification information at the managing server that may allow a user of the managed host information handling system 300 to return the managed wireless peripheral device 368 to the correct owner/user.

Where the received leash token from the managed wireless peripheral device 368 does match the leash token stored on a data storage device at the managed host information handling system 300, leash authorization is confirmed at block 314 and the managed host information handling system 300 may proceed with securely and automatically pairing the managed wireless peripheral device 368 to the managed host information handling system 300. This may be done, at line 316, by establishing, for example, a secure channel by an elliptic-curve Diffie-Hellman (ECDH) key exchange, at line 318, ECDH key with the managed host information handling system 300. This may include, for example, the managed host information handling system 300 transmitting an information handling system public key (e.g., of a PrivateKeyP1/PublicKeyP1) to the managed wireless peripheral device 368 transmitting a peripheral device public key (e.g., of a DevPrivateKeyP1/DevPublicKeyP1 pair) to the managed host information handling system 300 at lines 320-1 and 320-2, respectively. Each of the managed host information handling system 300 and managed wireless peripheral device 368 may use these reciprocal public keys as input into a hash-based message authentication code (HMAC) algorithm to create a shared key. In an embodiment, this pair of keys are used as a fall back reset session key setup to be used in those scenarios where the connection between the managed wireless peripheral device 368 and the managed host information handling system 300 is to be reset or refreshed.

In an embodiment, this shared key may further be used to generate an OTP, at lines 324-1 and 324-2 to be used as a session key. This OTP may be a time-based OTP (TBOTP) that uses a timeblock to generate a current time stamp used within the HMAC algorithm (e.g., HMAC256). Additionally, a seed generator may be used to generate a random seed value or a salt value, a random data, to be used as input to the HMAC algorithm at lines 324-1 and 324-2. These random salts and time references are exchanged between the information handling system 300 and managed wireless peripheral device 368 at lines 326 and 330 for use as a keyseed to generate a hash or passcode as extra security for the passwords used for the pairing process when the leash tokens are verified. In an example embodiment, the managed wireless peripheral device 368 may generate a new current time reference 328 and transmit that new current time reference as the random salt to the managed host information handling system 300 for a keyseed. With a concatenation of the current time stamp and the random seed with the session key via the HMAC algorithm results in a TBOTP at both the managed host information handling system 300 and the wireless peripheral device. With this TBOTP, the managed wireless peripheral device 368 and managed wireless peripheral device 368 may securely complete pairing of the managed host information handling system 300 to the managed wireless peripheral device 368. It is appreciated that, although a specific OTP algorithm is described herein, the present specification contemplates that any type of OTP algorithm may be used to create the session key as described herein. With the managed host information handling system 300 and managed wireless peripheral device 368 leashed via the leash tokens and the wireless pairing authenticated, the method 301 may end.

Figure 4:
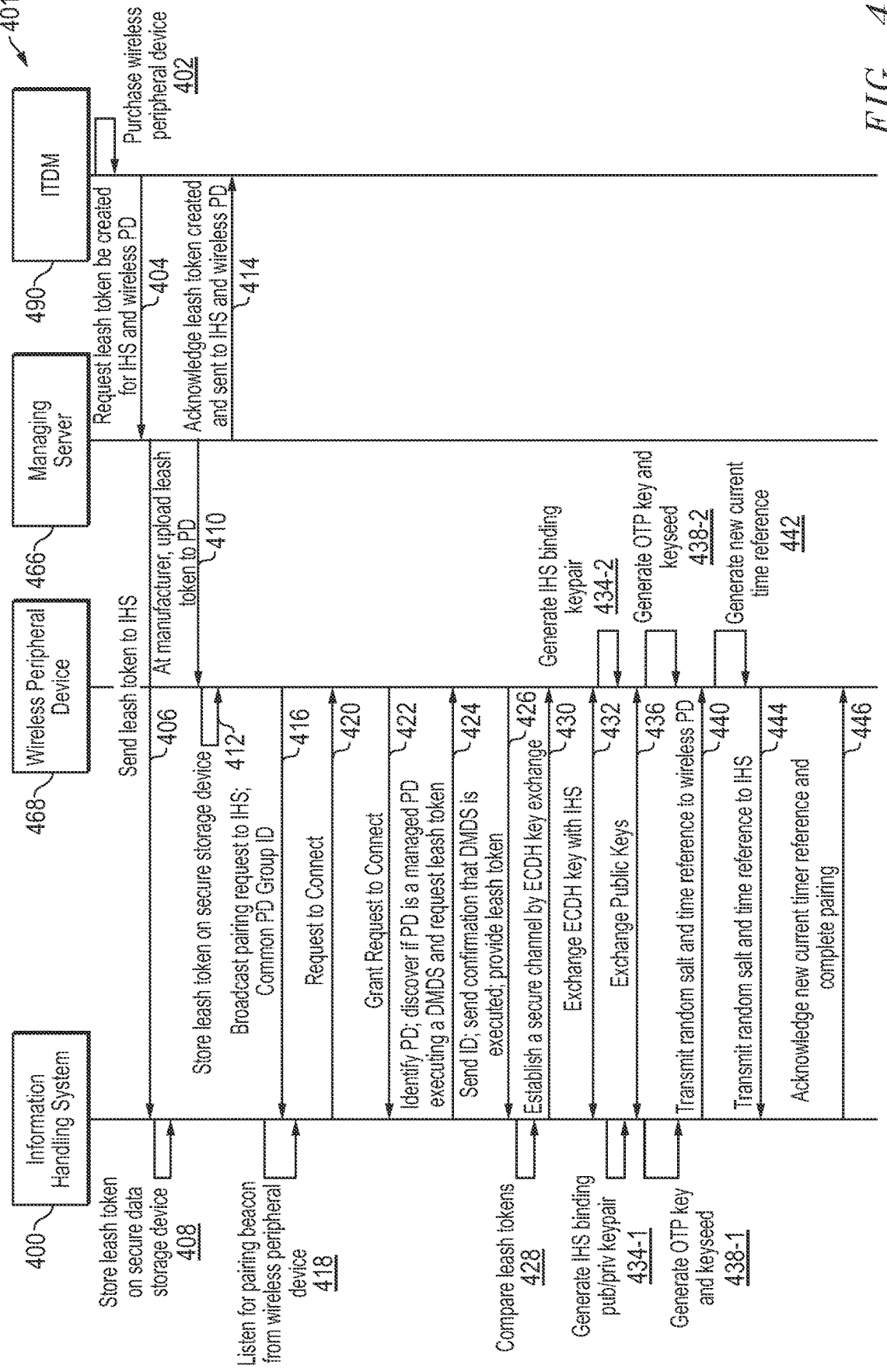
FIG. 4 is a flowchart showing a method of an ITDM directing the pairing of a peripheral device to an information handling system and leashing that peripheral device to the information handling system using a leash token according to an embodiment of the present disclosure.

FIG. 4 is a swim lane flowchart showing a method 401 of an ITDM directing the pairing of a managed wireless peripheral device 468 to an information handling system 400 and leashing that managed wireless peripheral device 468 to the managed host information handling system 400 using a leash token according to an embodiment of the present disclosure. The process described herein allows an ITDM to assign a specific managed wireless peripheral device 468 to the managed host information handling system 400 by having a specific leash token generated and uploaded to the managed host information handling system 400 and managed wireless peripheral device 468.

The method 401 may include, at line 402, the ITDM 490 to purchase or otherwise acquire a wireless peripheral device 468 for management by an enterprise to be leashed to limit use outside of a particular managed host information handling system 400 of the enterprise. It is appreciated that the wireless peripheral device may be capable of being a managed wireless peripheral device 468 with the managed wireless peripheral device 468 executing computer-readable program code instructions of the peripheral device MDS module as described herein. In an embodiment, execution of the peripheral device MDS module changes operation of the software/firmware of the managed wireless peripheral device 468 with respect to pairing capabilities to limit pairing to a single managed host information handling system 400 that, as described herein, includes a matching leash token as determined by an ITDM 490. In an embodiment, the execution of the peripheral device MDS module by the hardware microcontroller of the managed wireless peripheral device 468 may allow for a single wireless connection with the managed host information handling system 300. For example, where the managed wireless peripheral device 468 includes multiple wireless connection slots that allow the managed wireless peripheral device 468 to be potentially paired with multiple other devices (e.g., an information handling system, a smartphone, and the like), the execution of the peripheral device MDS module may eliminate any additional wireless slots by preventing any additional pairing data from being stored on the data storage device of the managed wireless peripheral device 468 or preventing and further pairing authentication from occurring that would allow managed wireless peripheral device 468 to be paired with any other information handling system or other pairable device.

As described herein, the ITDM may be responsible for purchasing the managed wireless peripheral device 468 on behalf of an enterprise including a user of the managed host information handling system 400 within the enterprise in an example embodiment. By doing so, the ITDM 490 may cause a leash token to be generated and stored on a secure data storage device of the managed wireless peripheral device 468. At line 404, in an embodiment, the ITDM 490 may via a managing server 466 executing code instructions of a ITDM leash token generator module create or generate a leash token pair for the managed host information handling system 400 and managed wireless peripheral device 468. These leash tokens are generated to match and allow for later secure pairing between the managed host information handling system 400 when leashed and authorized for pairing and operatively coupling to the managed wireless peripheral device 468. In an embodiment, the managing server 466 may securely maintain a listing of the leash tokens for later upload to or seeding and generation at the managed host information handling system 400 and managed wireless peripheral device 468.

For example, at line 406, the leash token may be sent to the managed host information handling system 400. This may be done under the direction of the ITDM via execution of an ITDM leash toke generator module by a hardware processor of the managing server 466. This may require the managed host information handling system 400 to download the leash token or random seed data and have an algorithm to generate the same at the managed host information handling system 400 and securely store, at line 408, the leash token in a secure data storage device at the managed host information handling system 400. In an embodiment, the secure data storage device may be non-volatile memory that is prevented from being altered without authentication from a user or ITDM at the managed host information handling system 400.

Additionally, at line 410, the leash token, or seed values for generating the same with an algorithm at the managed peripheral device 468, may be uploaded to a secure, non-volatile data storage device of the managed wireless peripheral device 468 under the direction of the managing server 466. This upload may be completed, for example, at the manufacturer's location where the managed wireless peripheral device 468 has been manufactured. In this embodiment, the uploading of the leash token may be completed on an assembly line or after the managed wireless peripheral device 468 has been manufactured. In an alternative embodiment, the ITDM 490, after receiving the shipped managed wireless peripheral device 468, may scan the managed wireless peripheral device 468 and wirelessly access the managed wireless peripheral device 468 to upload the leash token directly to the non-volatile memory device before deployment of the managed wireless peripheral device 468. Again, at line 412, this leash token is stored on a non-volatile memory device within the managed wireless peripheral device 468.

In an embodiment, the managing server 466 may monitor the processes in lines 406 through 410 and, at line 414, provide an acknowledgement to the ITDM 490, such as a message displayed via a GUI to the ITDM, that the matching leash tokens have been uploaded or otherwise provided to the managed wireless peripheral device 468 and information handling system 400. The ITDM 490 may complete the tasks in lines 402 through 414 via the use of an information handling system operatively coupled to or input/output device operatively coupled to the managing server 466 and may provide authorization data such as a password to complete the processes.

As described herein, the pairing process may continue similarly to that described in connection with FIG. 3. For example, the initiation of the managed wireless peripheral device 468 causes the peripheral device PMU to provide power to the peripheral device microcontroller. The peripheral device microcontroller may then, at line 416, broadcast the pairing request to the managed host information handling system 400. Again, this broadcast includes at least a device ID to identify the managed wireless peripheral device 468 to the managed host information handling system 400. At line 418, the managed host information handling system 400 may listen or otherwise detect the pairing beacon from the managed wireless peripheral device.

At line 420 a request to connect with the managed wireless peripheral device 468 is sent from the managed host information handling system 400. This request is responded to by the managed wireless peripheral device 468 granting the request to connect at line 422. As described herein, this communication is facilitated by a wireless interface device transceiving with a wireless peripheral device radio 484 via, for example, a Bluetooth® or Bluetooth® Low Energy (BLE) protocols.

At lines 424 and 426, the managed host information handling system 400 if executing code instructions of a host MDS module may request and receive from the managed wireless peripheral device 468 the identification data, a confirmation that the peripheral device microcontroller is executing the peripheral device MDS module thereby operating as a managed wireless peripheral device 468 and provide the leash token to the managed host information handling system 400. Again, this leash token is stored on a secure data storge device within the managed wireless peripheral device 468 and transmitted to a secure data storage at the managed host information handling system 400 via execution of the host MDS module.

At line 428, the managed host information handling system 400 may execute the code instructions for the host MDS module to compare the leash token received from the managed wireless peripheral device 468 with a leash token generated or maintained on a secure data storage device within the managed host information handling system 400. In this embodiment, the managed host information handling system 400 may function to determine whether the managed wireless peripheral device 468 is leashed to and may be operatively coupled to the managed host information handling system 400 based on matching of the leash tokens. It is appreciated that where the received leash token from the managed wireless peripheral device 468 does not match the leash token stored on a data storage device at the managed host information handling system 400 or the information handling system 400 is not a managed host information handling system executing a host MDS module, the managed host information handling system 400 or other information handling system and the managed peripheral device 468 do not proceed with wirelessly pairing the managed wireless peripheral device 468 with the information handling system 400. Where it is determined that the leash tokens do not match, the managed host information handling system 400 may be provided with the capability via execution of the host MDS module to determine which information handling system the managed wireless peripheral device 468 is to be paired to and/or is currently assigned to by access to the managing server 466. For example, the execution of the computer-readable program code instructions of the host MDS module allows the user to discover an owner or assigned user of the managed wireless peripheral device 468 and, accordingly, an information handling system that the managed wireless peripheral device 468 is to be paired with or is already paired with. In an example embodiment, the managed host information handling system 400 may access a managing server 466 via a network connection (not shown in FIG. 4). By accessing the managing server 466, the hardware processor of the information handling system 400 may compare the leash token received from the managed wireless peripheral device 468 to a listing of leash tokens associated with a number of or all managed wireless peripheral devices and associated owners, enterprises, addresses, contact information, or other user identification information that may allow a user of the managed host information handling system 400 to return the managed wireless peripheral device 168 to the correct owner/user.

Where the received leash token from the managed wireless peripheral device 468 does match the leash token stored on a data storage device at the information handling system 400, the managed host information handling system 400 may proceed with securely and automatically pairing the managed wireless peripheral device 468 to the managed host information handling system 400. This may be done, at line 430, by establishing, for example, a secure channel by an elliptic-curve Diffie-Hellman (ECDH) key exchange and, at line 432, an ECDH key with the managed host information handling system 400. This may include, for example, the information handling system 400 transmitting a managed host information handling system public key (e.g., of a PrivateKeyP1/PublicKeyP1) to the managed wireless peripheral device 468 transmitting a peripheral device public key (e.g., of a DevPrivateKeyP1/DevPublicKeyP1 pair) to the managed host information handling system 400 at lines 434-1 and 434-2, respectively. Each of the managed host information handling system 400 and managed wireless peripheral device 468 may use these reciprocal public keys as input into a hash-based message authentication code (HMAC) algorithm to create a shared key. In an embodiment, this pair of keys are used as a fall back reset session key setup to be used in those scenarios where the connection between the managed wireless peripheral device 468 and the managed host information handling system 400 is to be reset or refreshed.

In an embodiment, this shared key may further be used to generate an OTP, at lines 438-1 and 438-2 to be used as a session key. This OTP may be a time-based OTP (TBOTP) that uses a timeblock to generate a current time stamp used within the HMAC algorithm (e.g., HMAC256). Additionally, a seed generator may be used to generate a random seed value such as a salt value that may be based on a time or other value to be used as input to the HMAC algorithm at lines 434-1 and 434-2. These random salts and time references are exchanged between the managed host information handling system 400 and managed wireless peripheral device 468 at lines 440 and 444 and acknowledged at line 446. In an example embodiment, the managed wireless peripheral device 468 may generate a new current time reference at line 442 and transmit that new current time reference as the random salt to the managed host information handling system 400. With a concatenation of the current time stamp and the random seed with the session key via the HMAC algorithm results in a TBOTP at both the managed host information handling system 400 and the wireless peripheral device. With this TBOTP, the managed wireless peripheral device 468 and managed host information handling system 400 may securely complete pairing at line 446 and be operatively coupled to transmit or receive input or output. It is appreciated that, although a specific OTP algorithm is described herein, the present specification contemplates that any type of OTP algorithm may be used to create the session key as described herein. With the managed host information handling system 400 and managed wireless peripheral device 468 leashed via the leash token and wirelessly paired for operative coupling during input and output data exchange, the method 401 may end.

Figure 5:
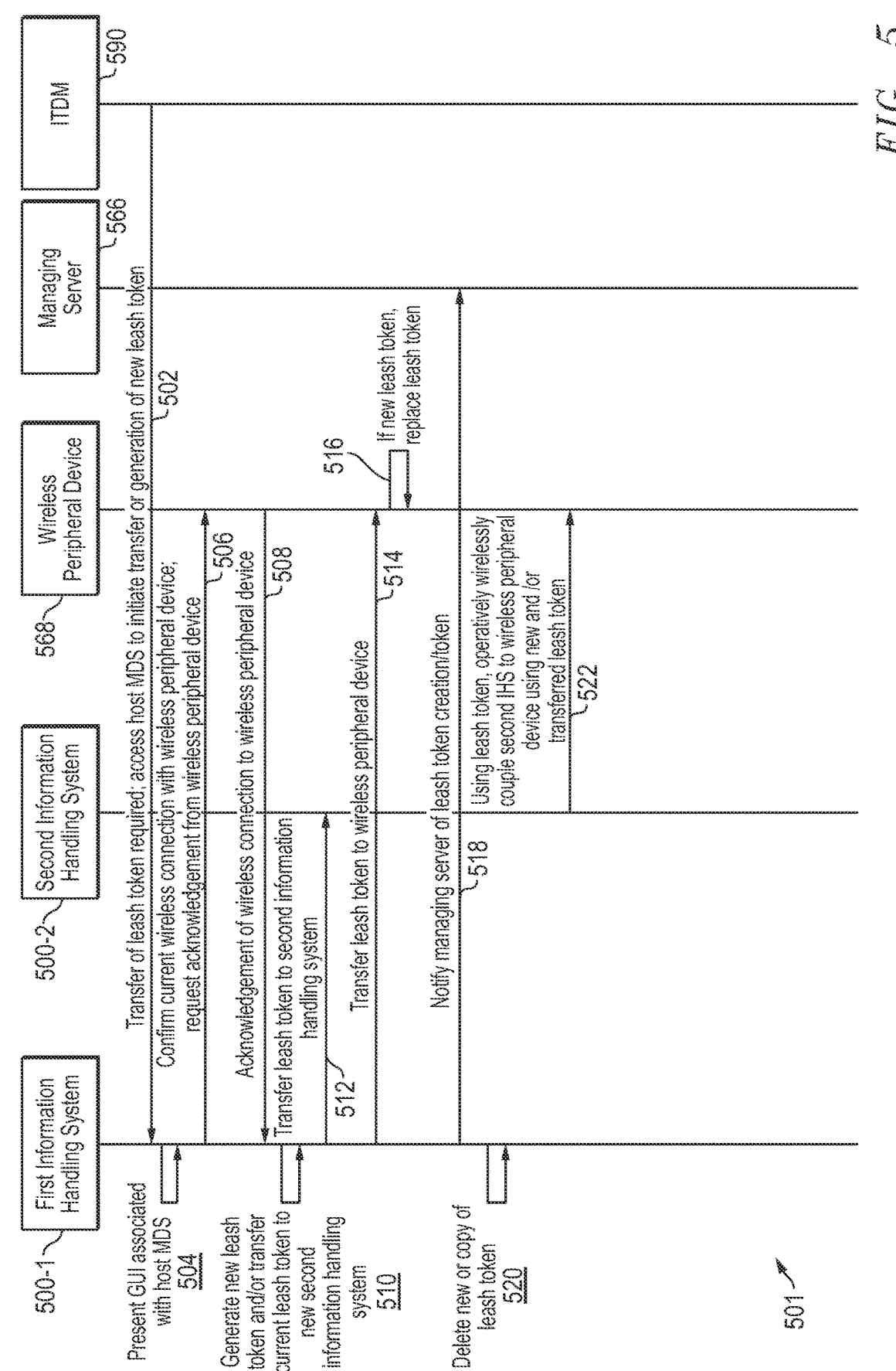
FIG. 5 is a flowchart showing a method of an ITDM directing a new leash token to be created or an existing leash token to be transferred to a second information handling system for the pairing of a wireless peripheral device to a second information handling system and leashing that peripheral device to the second information handling system using a leash token according to an embodiment of the present disclosure.

FIG. 5 is a swim lane flowchart showing a method 501 of an ITDM directing a new leash token to be created or an existing leash token to be transferred to a second information handling system 500-2 for the pairing of a wireless peripheral device 568 to the second information handling system 500-2 and leashing that wireless peripheral device 568 to the second information handling system 500-2 using a leash token according to an embodiment of the present disclosure. As described herein, the ITDM 590 may use an information handling system or other input output devices operated by the ITDM 590 to operatively couple and provide input to a GUI at the managing server 566. The managing server 566 may be operatively coupled to the first information handling system 500-1, the second information handling system 500-2, and the wireless peripheral device 568 via one or more wired or wireless connections.

In an embodiment, the method 501 may include the ITDM 590 directing that the leash token be transferred from the first information handling system 500-1 to a second information handling system 500-2 at line 502 where both are managed host information handling systems executing code instructions of a host MDS module. This includes the ITDM 590 to access and transmitting instructions to the host MDS of the first information handling system 500-1 to either transfer or generate a new leash token. Again, the information handling system operated by the ITDM 590 may interface with executed computer-readable program code instructions of a host MDS module at the first information handling system 500-1 to gain access and authorization to complete the transfer. For example, execution of a management MDS module at either the information handling system operated by the ITDM 590 or the managing server 566 may allow a password to be input into a GUI present to the ITDM 590 in order to gain access to send instructions to the first information handling system 500-1 and the host MDS module executing there and to the leash token described herein.

In an alternative embodiment, at line 504, a GUI may be presented at a video display device of the first information handling system 500-1 or at a managing server 566 (not shown). Again, a user or an ITDM may access, directly, the ability to input the password or other authorization to allow for access to the leash token. With the first information handling system 500-1, the wireless peripheral device 568 may be operatively coupled to the first information handling system 500-1 at line 506 in order to confirm a current pairing, leashing, and wireless connection with the wireless peripheral device 568 and request acknowledgement of the connection with the first information handling system 500-1 at line 508. As described herein, the leash tokens associated with the first information handling system 500-1 and wireless peripheral device 568 may be concurrently deleted, transferred, or changed in order to leash the wireless peripheral device 568 to a second information handling system 500-2. As such a current wireless connection with the wireless peripheral device 568 allows the ITDM 590 to makes these changes concurrently in order to securely unleash the first information handling system 500-1 from the wireless peripheral device 568 and leash the second information handling system 500-2 to the wireless peripheral device 568.

At line 510, the method 501 includes either generating a new leash token or transferring a current leash token from the first information handling system 500-1 to a second information handling system 500-2. As described herein, execution of the computer-readable program code instructions of the new leash token generator module by the hardware processor of the information handling system may present to the user or ITDM the option to change/create a new leash token or transfer the current leash token. Again, in an embodiment, this new leash token may be generated using, for example, a hash function similar to that associated with the OTP algorithm and may include a concatenation of multiple inputs into this hash function in order to create a unique and new leash token. This new leash token may include any number of bytes and may be sufficiently long of enough to provide a level of security between the managed wireless peripheral device and a newly assigned information handling system. Where the ITDM 590 or user has decided to generate a new leash token, this leash token may be transmitted, at line, 514, to the wireless peripheral device 568 and uploaded to the secure data storage device. In an embodiment, at line 516, the transmission of a new leash token causes the overwriting of the old leash token.

Whether a new leash token is generated or the current leash token is to be transferred, the leash token may be transferred to the second information handling system 500-2 at line 512. In another embodiment, the managing server 566 may receive or generate the new or current leash token and, at a later time, upload the new or current leash token to the second information handling system 500-2. Alternatively, a wired or wireless connection between the first information handling system 500-1 and second information handling system 500-2 may be established for the transmission of the new or current leash token to the second information handling system 500-2.

In the embodiment where a new leash token was generated at line 510 occurs at information handing system 500-1, the managing server 566 may be notified of, at least, the generation of the new leash token at line 518. In an example embodiment, the new leash token may be used to define the use of the wireless peripheral device 568 and leashing to second information handling system 500-2.

At line 520, the method 501 may proceed to delete the new leash token or copy of the leash token. This is done so that the first information handling system 500-1 may no longer be allowed to be operatively coupled to the wireless peripheral device 568. This may increase the security between the second information handling system 500-2 and wireless peripheral device 568 by providing that the wireless peripheral device 568 can only be wirelessly coupled to the second information handling system 500-2 and is, accordingly, leashed to the second information handling system 500-2.

At line 522, the method 501 also includes using the leash token of the second information handling system 500-2 to confirm leashing to the wireless peripheral device to authorize and enable operatively wireless coupling between the second information handling system 500-2 and the wireless peripheral device 568. This pairing process may include similar pairing processes as those described in connection with FIG. 3. At this point, the method 501 may end.

FIG. 6 is a flowchart showing a method 601 of authorized pairing a managed wireless peripheral device to an information handling system only when that wireless peripheral device is confirmed to be leashed to the information handling system using comparison of leash tokens according to an embodiment of the present disclosure. In an embodiment, the method 501 may include the initiation of the managed wireless peripheral device and the information handling system at block 602. The may be completed by the user actuating a switch, button, or other actuation key used to turn on the managed wireless peripheral device as well as the information handling system.

At block 604, the initiation of the managed wireless peripheral device causes the peripheral device PMU to provide power to the peripheral device microcontroller allowing the peripheral device microcontroller to then broadcast the pairing request to the information handling system. Again, this broadcast includes at least a device ID to identify the managed wireless peripheral device to the information handling system.

At block 606, the information handling system may listen or otherwise detect the pairing beacon from the managed wireless peripheral device. As described herein, the information handling system may include a wireless interface device to transceive data to and from the wireless peripheral device under a GATT messaging protocol of the Bluetooth® or BLE protocol as described herein.

At block 608, a request to connect with the managed wireless peripheral device is sent from the information handling system to the wireless peripheral device after detecting the broadcast. This request may then be responded to by the managed wireless peripheral device granting the request to connect at block 610. As described herein, this communication is facilitated by the wireless interface device transceiving with a wireless peripheral device radio via, for example, a Bluetooth® or BLE protocols.

At blocks 612 and 614, if the information handling system includes a host MDS module to determine leash status of the managed wireless peripheral device, the information handling system is a managed host information handling system. In such as case, the managed host information handling system may request and receive from the managed wireless peripheral device the identification data, a confirmation that the peripheral device microcontroller is executing the peripheral device MDS module thereby operating as a managed wireless peripheral device and provide the leash token to the managed host information handling system. If such a request does not come from the information handling system per execution of the host MDS module, the wireless peripheral device will block any further pairing at block 612 and the method may end. If, however, a request is received at 612, then the information handling system is a managed host information handling system and the leash token may be provided from the managed wireless peripheral device to the managed host information handling system at block 614. Again, this leash token is stored on a secure data storge device within the managed wireless peripheral device. This secure data storage device may include a non-volatile storage device that is alterable only upon authorized access by the use of a secure password.

At block 616, the managed host information handling system may compare the leash token received from the managed wireless peripheral device with a leash token maintained on a secure data storage device within the managed host information handling system. In this embodiment, the managed host information handling system may function to determine whether the managed wireless peripheral device is leashed to the managed host information handling system and, thus, authorized to be paired and operatively coupled to the managed host information handling system.

At block 620, it is appreciated that where the received leash token from the managed wireless peripheral device does not match the leash token stored on a data storage device at the managed host information handling system, the managed host information handling system and the manage wireless peripheral device do not proceed with wirelessly pairing and the method 601 may end. Where it is determined that the leash tokens do not match, in an embodiment the managed host information handling system may be provided with the capability via execution of code instructions for the host MDS module to determine which information handling system the managed wireless peripheral device is leashed to and to be paired with and/or is currently assigned to. For example, the execution of the computer-readable program code instructions of the host MDS module allows the user to discover an owner or assigned user of the managed wireless peripheral device and, accordingly, an information handling system that the managed wireless peripheral device is to be paired with or is already paired with via access to a managing server in some embodiments. In an example embodiment, the managed host information handling system may access the managing server via a network connection. By accessing the managing server, the hardware processor of the managed host information handling system may compare the leash token received from the managed wireless peripheral device to a listing of leash tokens associated with a number of or all managed wireless peripheral devices and associated owners, enterprises, addresses, contact information, managed host information handling systems, or other user identification information that may allow a user of the information handling system to return the managed wireless peripheral device to the correct owner/user.

Where the received leash token from the managed wireless peripheral device does match the leash token stored on a data storage device at the managed host information handling system at block 620, the managed host information handling system may proceed with securely and automatically pairing the managed wireless peripheral device to the managed host information handling system.

Thus, at block 622, a secure channel may be established by, for example, using an elliptic-curve Diffie-Hellman (ECDH) key exchange using a ECDH algorithm at the managed host information handling system. This may include, for example, the managed host information handling system generating a managed host information handling system public key (e.g., of a PrivateKeyP1/PublicKeyP1) at the managed host information handling system and generating a peripheral device public key (e.g., of a DevPrivateKeyP1/DevPublicKeyP1 pair) at the wireless peripheral device at block 626. At block 628 these public keys may also be exchanged between the managed host information handling system and managed wireless peripheral device. In an embodiment, these pair of keys are used as a fall back reset session key setup to be used in those scenarios where the connection between the managed wireless peripheral device and the managed host information handling system is to be reset or refreshed. This may occur where a wireless connection between the managed host information handling system and the wireless peripheral device is temporarily disabled.

Each of the managed host information handling system and managed wireless peripheral device may use these reciprocal public keys as input into a hash-based message authentication code (HMAC) algorithm to create a shared key at block 630 to generate an OTP to be used as a session key. This OTP may be a time-based OTP (TBOTP) that uses a timeblock to generate a current time stamp used within the HMAC algorithm (e.g., HMAC256). Additionally, a seed generator of the managed host information handling system and the wireless peripheral device may be used to generate a random seed or random salt values that may be based on selected time values or other values to be used as input to the HMAC algorithm for added security. These random salts and time references are exchanged between the managed host information handling system and managed wireless peripheral device at block 632 with the wireless peripheral device generating a new current time reference to the managed host information handling system when it has received the time reference stamp from the managed host information handling system at block 634. In an embodiment, the managed wireless peripheral device may generate the new current time reference and transmit that new current time reference as the random salt for key or passcode generation to the managed host information handling system.

With a concatenation of the current time stamp and the random seed with the session key via the HMAC algorithm results in a TBOTP at both the managed host information handling system and the wireless peripheral device at block 638. With this TBOTP, the managed wireless peripheral device may securely complete pairing of the managed host information handling system to the authenticated and leashed managed wireless peripheral device. It is appreciated that, although a specific OTP algorithm is described herein, the present specification contemplates that any type of OTP algorithm may be used to create the session key as described herein. With the managed host information handling system and managed wireless peripheral device leashed to the managed host information handling system and authorized to pair and operatively couple via the leash token, the method may end.

The blocks of the flow diagrams of FIGS. 3, 4, 5, and 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A managed host information handling system for leashing a managed wireless peripheral device comprising:

a hardware processor;

a data storage device;

a wireless radio to wirelessly couple to a managed wireless peripheral device;

the hardware processor to, via the wireless radio, communicate with the managed wireless peripheral device via a secure link to:

transmit a request message to determine that the managed wireless peripheral device is executing computer-readable program code instructions of a peripheral device managed device service module to determine when the managed wireless peripheral device is leashed to and authorized to pair with the managed host information handling system; and receive a second leash token from the managed wireless peripheral device and indication that the managed wireless peripheral device is executing the computer-readable program code instructions of the peripheral device managed device service module;

the hardware processor to execute computer-readable program code instructions of a host managed device service (MDS) module to determine that a first leash token on the managed host information handling system matches the second leash token received from the managed wireless peripheral device and to initiate an authorized pairing process with the managed wireless peripheral device after determining that the received second leash token matches the first leash token; and the hardware processor to execute computer-readable program code instructions of a one-time-password (OTP) algorithm to generate an OTP to exclusively pair the managed host information handling system with the managed wireless peripheral device based on the second leash token matching the first leash token.

2. The managed host information handling system of claim 1 further comprising:

the OTP algorithm is a time-based one-time-password (TBOTP) algorithm with the hardware processor of the information handling system using a time-based key to derive the TBOTP.

3. The managed host information handling system of claim 1 further comprising:

the managed host information handling system operatively coupled to a wireless network to receive the first leash token from a managing server as directed by an internet technology decision maker (ITDM) for storage in a secure storage area on the managed host information handling system.

4. The managed host information handling system of claim 3 further comprising:

the received second leash token from the managed wireless peripheral device having been uploaded to the managed wireless peripheral device prior to the managed wireless peripheral device being shipped to a user of the managed host information handling system.

5. The managed host information handling system of claim 1 further comprising:

the OTP algorithm including:

a seed generator to generate a random seed at the managed host information handling system; and a public key generated by a hash-based message authentication code (HMAC) 256 algorithm at the managed host information handling system;

the hardware processor to, via the wireless radio, send the random seed and public key to the managed wireless peripheral device to concatenate the random seed and public key using a HMAC256 algorithm.

6. The managed host information handling system of claim 1 further comprising:

the hardware processor to execute computer-readable program code instructions of the host MDS module to prevented the managed wireless peripheral device from being paired with the managed host information handling system when the received second leash token does not match the first leash token.

7. The managed host information handling system of claim 1 further comprising:

the hardware processor to execute computer-readable program code instructions of a new leash token generator module to present to a user of the managed host information handling system, via a video display device, a graphical user interface (GUI) to allow the user with a password to transfer possession of first leash token to a second information handling system for leashed pairing of the second information handling system with the managed wireless peripheral device.

8. The managed host information handling system of claim 1, wherein when the hardware processor does not transmit, via the wireless radio, the request message to determine that the managed wireless peripheral device is executing computer-readable program code instructions of the peripheral device managed device service module to determine when the managed wireless peripheral device is leashed to and authorized to pair with the managed host information handling system, the managed wireless peripheral device block pairing with the managed host information handling system.

9. A method of leashing a managed wireless peripheral device to a managed host information handling system comprising:

establishing a communication between the managed host information handling system and the managed wireless peripheral device;

executing computer-readable program code instructions of a host managed device service (MDS) module with a hardware processor to determine:

that the managed wireless peripheral device is executing computer-readable program code instructions of a peripheral device managed device service module to be managed by the managed host information handling system; and that a first leash token stored on the managed host information handling system matches a second leash token received from the managed wireless peripheral device data;

executing computer-readable program code instructions of the MDS module with the hardware processor to initiate an authorized pairing process with the managed wireless peripheral device after determining that the second leash token received from the managed wireless peripheral device matches the first leash token stored at the managed host information handling system such that the managed wireless peripheral device is leashed to the managed host information handling system; and execute computer-readable program code instructions of a one-time-password (OTP) algorithm to generate an OTP, with the hardware processor of, to exclusively pair the managed host information handling system with the managed wireless peripheral device based on the first leash token matching the second leash token.

10. The method of claim 9 further comprising:

the OTP algorithm is a time-based one-time-password (TBOTP) algorithm with the hardware processor using a time-based key to derive the TBOTP.

11. The method of claim 9 further comprising:

operatively coupling the managed host information handling system to a wireless network to receive the first leash token from a managing server as directed by an internet technology decision maker (ITDM).

12. The method of claim 11, wherein the second leash token is uploaded to the managed wireless peripheral device prior to the managed wireless peripheral device being shipped to a user of the managed host information handling system.

13. The method of claim 9 further comprising:

the OTP algorithm including:

a seed generator to generate a random seed at the managed host information handling system; and a public key generated by a hash-based message authentication code (HMAC) 256 algorithm at the managed host information handling system; and sending the random seed and public key, via the wireless radio, to the managed wireless peripheral device to concatenate the random seed and public key using a HMAC256 algorithm.

14. The method of claim 9 further comprising:

executing computer-readable program code instructions of the host MDS module, via the hardware processor, to prevent the managed wireless peripheral device from being paired with the managed host information handling system when the received second leash token does not match the first leash token.

15. The method of claim 9 further comprising:

executing computer-readable program code instructions of a new leash token generator module, via the hardware processor, to present to a user of the managed host information handling system, via a video display device, a graphical user interface (GUI) to allow the user, upon presentation of authorization, to transfer possession of the first leash token to a second information handling system for leashed pairing with the managed wireless peripheral device and the second information handling system.

16. The method of claim 9 further comprising:

not transmitting, via a wireless radio, a request message to the managed wireless peripheral device to determine that the managed wireless peripheral device is executing computer-readable program code instructions of the peripheral device managed device service module, where the failure to transmit the request message is an indication that the managed wireless peripheral device is not leashed to and not authorized to pair with the managed host information handling system; and blocking the managed wireless peripheral device from pairing with the managed host information handling system.

17. A managed host information handling system comprising:

a hardware processor;

a data storage device;

a wireless radio to wirelessly couple to a managed wireless peripheral device;

the managed host information handling system operatively coupled to a wireless network to receive a first leash token from a managing server pursuant to an internet technology decision maker (ITDM), wherein the ITDM directs that a matching, second leash token be uploaded to the managed wireless peripheral device prior to the managed wireless peripheral device being shipped to a user of the managed host information handling system;

the hardware processor to, via the wireless radio, communicate with the managed wireless peripheral device via a secure link to:

transmit a request message to determine that the managed wireless peripheral device is executing computer-readable program code instructions of a peripheral device managed device service module to determine when the managed wireless peripheral device is leashed to and authorized to pair with the managed host information handling system;

receive the second leash token from the managed wireless peripheral device; and the hardware processor to execute computer-readable program code instructions of a host managed device service (MDS) module to determine that the first leash token on the managed host information handling system matches the received, second leash token from a managed wireless peripheral device data storage device and to initiate an authorized pairing process with the managed wireless peripheral device after determining that the first leash token matches the received, second leash token.

18. The managed host information handling system of claim 17 further comprising:

the hardware processor to execute computer-readable program code instructions of a one-time-password (OTP) algorithm to generate an OTP to exclusively pair the managed host information handling system with the managed wireless peripheral device based on the first leash token matching the second leash token.

19. The managed host information handling system of claim 17 further comprising:

the OTP algorithm is a time-based one-time-password (TBOTP) algorithm with the hardware processor of the information handling system using a time-based key to derive the TBOTP.

20. The managed host information handling system of claim 17 further comprising:

the hardware processor to execute computer-readable program code instructions of the host MDS module to prevent being pairing of the managed wireless peripheral device with the managed host information handling system when the received second leash token does not match the first leash token.

* * * * *